United States Patent
Millhouse

(10) Patent No.: US 10,577,150 B2
(45) Date of Patent: Mar. 3, 2020

(54) CONFIGURABLE ROLLING PALLET TRAY SYSTEM

(71) Applicant: Walmart Apollo, LLC, Bentonville, AR (US)

(72) Inventor: Andrew B. Millhouse, Gilbert, AZ (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 16/014,283

(22) Filed: Jun. 21, 2018

(65) Prior Publication Data
US 2019/0031394 A1    Jan. 31, 2019

Related U.S. Application Data

(60) Provisional application No. 62/537,538, filed on Jul. 27, 2017.

(51) Int. Cl.
| | | |
|---|---|---|
| *B65D 19/42* | (2006.01) | |
| *B62B 5/04* | (2006.01) | |
| *B62B 3/00* | (2006.01) | |
| *B62B 5/00* | (2006.01) | |
| *B65D 19/44* | (2006.01) | |

(52) U.S. Cl.
CPC .............. *B65D 19/42* (2013.01); *B62B 3/008* (2013.01); *B62B 5/0093* (2013.01); *B62B 5/0404* (2013.01); *B62B 5/049* (2013.01); *B65D 19/44* (2013.01); *B62B 5/0076* (2013.01); *B62B 2207/02* (2013.01); *B65D 2519/00024* (2013.01); *B65D 2519/00034* (2013.01)

(58) Field of Classification Search
CPC ........ B65D 19/42; B65D 19/40; B65D 19/44; B65D 2519/00024; B65D 2519/00034; B62B 3/008; B62B 5/0093; B62B 5/0404; B62B 5/049; B62B 5/0076; B62B 2207/02
USPC ....................................................... 280/79.11
See application file for complete search history.

(56) References Cited

U.S. PATENT DOCUMENTS

| | | | |
|---|---|---|---|
| 3,208,768 A | * | 9/1965 | Hulbert ................. B62B 5/0093 280/408 |
| 3,446,462 A | | 5/1969 | Brenia |

(Continued)

OTHER PUBLICATIONS

Thomas, Shane, "International Search Report", International Application No. PCT/US2018/038860, dated Sep. 14, 2018, 2 pages.

(Continued)

*Primary Examiner* — John D Walters

(57) ABSTRACT

Examples provides one or more rolling pallet trays capable of interlocking together to form a modular rolling platform. A rolling pallet tray includes a rectangular base member with a top surface, a bottom surface, and a set of four sides. The top surface may have a lip extending upward along at least a portion of the circumference of the top surface. A set of rollers are pivotally mounted to the bottom surface. A floor-lock brake may be activated to stop movement of at least one roller to lock the rolling pallet tray in place. A set of linking mechanisms is attached to one or more of the sides for linking the individual rolling pallet tray to one or more other rolling pallet trays in a variety of different configurations. The linked rolling pallet trays in the modular rolling pallet tray pivot together as a single unit for greater stability.

20 Claims, 13 Drawing Sheets

(56) References Cited

U.S. PATENT DOCUMENTS

| | | | |
|---|---|---|---|
| 3,493,085 A | 2/1970 | Libhart | |
| 5,282,641 A | 2/1994 | McLaughlin | |
| 5,785,328 A | 7/1998 | Eckloff | |
| 6,095,348 A * | 8/2000 | Karashima | A47F 5/103 |
| | | | 211/175 |
| 6,491,352 B2 | 12/2002 | Engle | |
| 6,550,794 B1 | 4/2003 | Spindel et al. | |
| 7,216,399 B2 * | 5/2007 | Webster | B62B 5/049 |
| | | | 16/32 |
| 7,665,788 B2 | 2/2010 | Dibdin et al. | |
| 8,317,204 B2 * | 11/2012 | Meers | B62B 3/02 |
| | | | 280/33.992 |
| 8,942,884 B2 | 1/2015 | Gibbs | |
| 9,045,321 B2 | 6/2015 | Ford et al. | |
| 9,045,797 B2 | 6/2015 | Hosomi et al. | |
| 9,611,070 B2 | 4/2017 | Ma | |
| 2006/0279054 A1 * | 12/2006 | Chung | A45C 13/385 |
| | | | 280/79.11 |
| 2008/0012260 A1 | 1/2008 | Ouyang et al. | |
| 2008/0211289 A1 | 9/2008 | Beiler | |
| 2011/0036671 A1 | 2/2011 | McKay et al. | |
| 2012/0267869 A1 * | 10/2012 | Hassell | B62B 5/0093 |
| | | | 280/79.11 |
| 2014/0360120 A1 | 12/2014 | Brisendine et al. | |

OTHER PUBLICATIONS

Thomas, Shane, "Written Opinion", International Application No. PCT/US2018/038860, dated Sep. 14, 2018, 8 pages.

Unknown, "Tugger Train Carts", FlexQube, Dec. 10, 2018, retreived Aug. 21, 2018, retreived from internet , https://www.flexqube.com/flexqube-news/tugger-train-carts, 10 pages.

Unknown, "Truckload Trailer Types—Flatbed—RGN—Stepdeck—Dry Van—Lowboy Trailer and More", FRC Logistics Inc., copyright 2017, https://www.freightratecentral.com/trucking-companies/flatbed-trucking-trailer-types, captured Apr. 14, 2017, 19 pages.

Unknown, "Marine Trailer Parts", Myrecstore, copyright 2017, https://myrecstore.ca/marine-trailer-parts, captured Apr. 14, 2017, 2 pages.

* cited by examiner

FIG. 4

INDIVIDUAL ROLLING PALLET TRAY 400

RECTANGULAR BASE MEMBER 402

TOP SURFACE 404

SURFACE AREA 410

PALLET 412

CIRCUMFERENCE 416

LIP 414

BOTTOM SURFACE 406

SET OF ROLLERS 418 ← FLOOR-LOCK BREAK 420

SET OF FOUR SIDES 408

SET OF LINKING MECHANISMS 422

CONNECTOR DEVICE 424

SIDE 426

RECEIVER DEVICE 428

SIDE 430

SET OF SLOT MEMBERS 432 ic # CONFIGURABLE ROLLING PALLET TRAY SYSTEM

BACKGROUND

Goods are frequently packaged into single unit pallets for shipping and loaded onto trucks or trailers for transport to a destination. During the loading process, loaders use fork lifts and manual pallet loaders to load and position pallets in a trailer or other transport one pallet at a time. As each pallet is loaded onto a trailer, the available aisle space for the loaders to walk as they load and position various pallets within the trailer interior shrinks. This increases the difficulty of the loading process as maneuvering room diminishes. Moreover, each pallet is typically assigned a space within the interior of the trailer. If a pallet which is supposed to be loaded into the back portion of the trailer is not yet available, other pallets which are ready for loading must wait to ensure pallets are placed in the correct order/positions. Once pallets are loaded into the trailer, those pallets placed in the back portion of the trailer away from the trailer door may be inaccessible without completely unloading other pallets placed nearer the door of the trailer. This makes pallet loading and unloading a slow, inflexible, tedious, and inefficient process.

SUMMARY

Examples of the disclosure provide a modular rolling platform system for moving pallets. The system provides two or more configurable rolling pallet trays capable of interlocking together in a plurality of different configurations. A first rolling pallet tray interlocks together with a second rolling pallet tray in at least four different rolling platform configurations. The first rolling pallet tray includes a rectangular base member. The rectangular base member has a top surface, a bottom surface, and a set of four sides. The top surface includes an area sufficient to accommodate a single pallet. A lip extends upward along a circumference of at least a portion of the top surface. A set of rollers are pivotally mounted to the bottom surface of the rectangular base member. A floor-lock brake associated with the bottom surface of the rectangular base member is configured to stop movement of at least one roller in the set of rollers upon activation of the floor-lock brake. A set of linking mechanisms are attached to at least one side in the set of four sides. The set of linking mechanisms includes a connector device on a first side in the set of four sides. The connector device is configured to removably attach to a receiver device on a side of the second rolling pallet tray. The first rolling pallet tray pivots together with the second rolling pallet tray as a single unit when the first rolling pallet tray is removably connected to the side of the second rolling pallet tray via the set of linking mechanisms.

Other examples provide a modular rolling platform for moving pallets. The modular rolling platform includes configurable rolling pallet trays. An individual rolling pallet tray includes a rectangular base member having a top surface area that is greater than or equal to a surface area of a base of an individual pallet. Each rolling pallet tray is configured to interlock together in a plurality of different configurations. A plurality of linking mechanisms removably attaches the plurality of configurable rolling pallet trays together to form a modular rolling platform for moving a set of pallets along a substantially horizontal surface. An individual rolling pallet tray is added to the modular rolling platform by linking a connector device on the individual rolling pallet tray to a receiver device associated with the modular rolling platform. An individual rolling pallet tray is removed from the modular rolling platform by detaching the connector device on the individual rolling pallet tray from at least one receiver device associated with the modular rolling platform. A set of rollers is pivotally mounted to a bottom surface of the modular rolling platform. A braking mechanism is configured to stop movement of at least one roller in the set of rollers.

Still other examples provide a modular rolling platform device. A plurality of configurable rolling pallet trays is linked together in a modular rolling platform for moving a plurality of pallets simultaneously. An individual rolling pallet tray pivots together with one or more other rolling pallet trays in the plurality of configurable rolling pallet trays. Each rolling pallet tray includes a rectangular base member having a top surface area that is greater than or equal to a surface area of a base of an individual pallet, a bottom surface, and a set of rollers associated with the bottom surface. The modular rolling platform device includes attaching means for connecting at least one side of a selected individual rolling pallet tray to at least one side of at least one other individual rolling pallet tray. The attaching means links two or more individual rolling pallet trays together in a plurality of different configurations. The modular rolling platform device includes braking means for stopping movement of at least one roller in the set of rollers associated with at least one individual rolling pallet tray in the plurality of configurable rolling pallet trays in response to receiving a brake-activation signal. The modular rolling platform device includes signal receiving means for receiving the brake-activation signal. When the signal receiving means receives the brake-activation signal, the braking means engages to stop movement of the modular rolling platform device. The modular rolling platform device includes detaching means for disconnecting a selected individual rolling pallet tray from the plurality of configurable rolling pallet trays in the modular rolling platform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is an exemplary block diagram illustrating an individual rolling pallet tray.

Corresponding reference characters indicate corresponding parts throughout the drawings.

DETAILED DESCRIPTION

Figure 1:
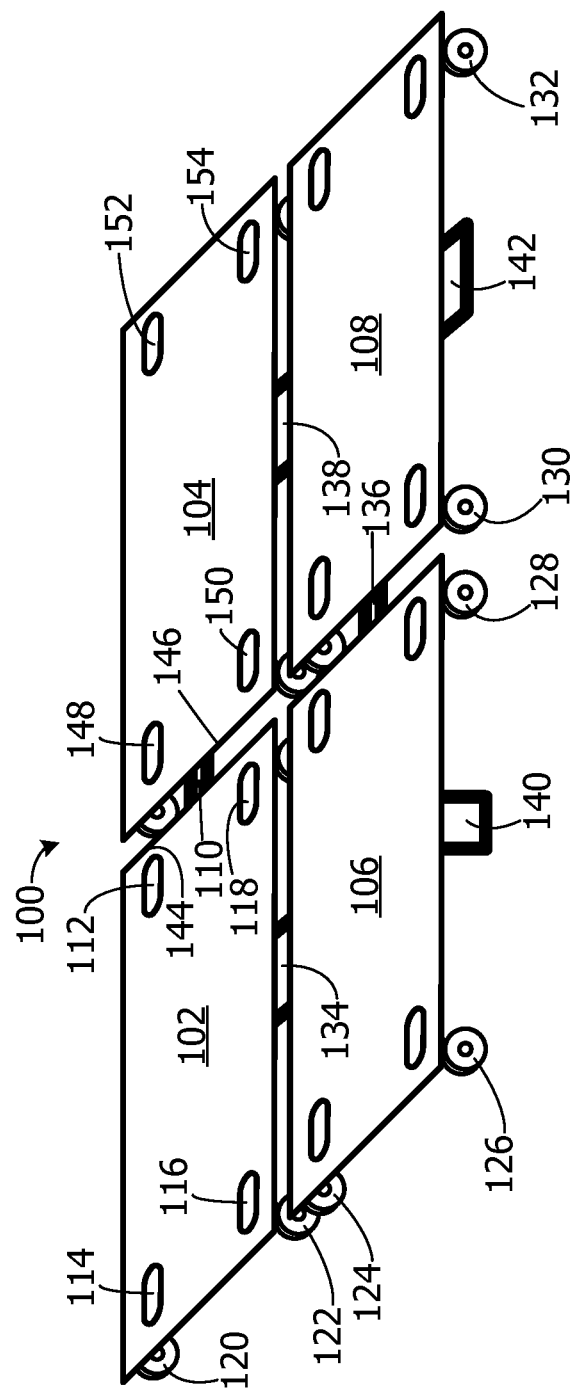
FIG. 1 is an exemplary elevation view of a rolling platform system for moving pallets.

Referring to the figures, examples of the disclosure enable a modular rolling platform system for moving one or more pallets. As used herein, a pallet refers to goods packaged for transport. In some examples, a pallet includes a unit load of goods supported on a flat transport structure. A pallet may include a skid. The goods in a pallet may be packaged in cases, boxes, crates, or any type of suitable packaging or containers.

In some examples, a plurality of configurable rolling pallet trays may be interlocked together in a plurality of different configurations. Each pallet tray may carry a single pallet of goods one-layer high. In other words, the pallets are not stacked on a rolling pallet tray.

The plurality of interlocked rolling pallet trays may carry a plurality of pallets as a single, configurable modular rolling platform. This enables safer and more efficient transportation of pallets in cramped spaces.

In some examples, each rolling pallet tray in the modular rolling platform includes a lip extending upward along a circumference of at least a portion of the top surface. The lip prevents a pallet from shifting or sliding off the rolling pallet tray. This enables the modular rolling platform to carry one or more pallets up or down ramps, around tight corners, or along curved or serpentine pathways without the pallet tipping or sliding off.

A set of linking mechanisms, in other examples, connects each individual rolling pallet tray to at least one other individual rolling pallet tray in the modular rolling platform. A connector device on one rolling pallet tray removably attaches to a receiver device on another rolling pallet tray. The attached rolling pallet trays pivot together as a single unit when the modular rolling pallet tray is in motion. In some examples, this prevents a first rolling pallet trays from twisting, pivoting, rotating, or otherwise moving in opposition to one or more other rolling pallet trays connected to the first rolling pallet tray.

Still other examples provide signal receiving means for receiving a brake-activation signal and/or a brake-release signal. If the signal receiving means receives the brake-activation signal, it engages a set of one or more floor-lock brakes to stop movement of one or more rollers for loading, unloading, or parking the modular rolling platform device. This enables greater control and stability during movement of the modular rolling platform device. The brake-release signal further enables wireless activation of brakes to stop motion of the modular rolling platform device remotely to prevent the modular rolling platform device from moving or sliding inside a trailer or other transport vehicle or container.

In yet other examples, each pallet to be loaded onto a transportation vehicle, such as a trailer, is placed onto a rolling pallet tray and connected to form a modular rolling platform for the trailer. The modular rolling platform may be configured and loaded with pallets in a loading area or a staging area. When all pallets are placed on a rolling pallet tray of the same modular rolling platform, the modular rolling platform is rolled onto the trailer. This enables all freight to be loaded onto a trailer simultaneously.

In another example, when it is time to unload the trailer at a destination, the modular rolling platform may be rolled out of the trailer as a single unit. In this manner, the entire freight within a trailer may be unloaded at one time. This enables very quick and simple unloading of freight, saving time and resources while enabling the trailer to be emptied and made available to transport another load more quickly.

Referring again to FIG. 1, an exemplary block diagram illustrates FIG. 1 is an exemplary block diagram illustrating a rolling platform system for moving pallets. A modular rolling platform 100 for moving one or more pallets in some examples includes a plurality of configurable rolling pallet trays capable of interlocking together in a plurality of configurations.

In this example, the plurality of configurable rolling pallet trays includes a first rolling pallet tray 102, a second rolling pallet tray 104, a third rolling pallet tray 106, and a fourth rolling pallet tray 108 interlocked together. The four individual rolling pallet trays are capable of interlocking together in at least four different configurations. In this example, the four rolling platform trays are connected to form a substantially square or rectangular shaped modular rolling platform capable of moving up to four pallets of goods simultaneously.

However, the examples are not limited to four rolling pallet trays connected for transporting up to four pallets. In other examples, the modular rolling platform 100 may include two or more rolling pallet trays. Each rolling pallet tray can carry a single pallet. If the modular rolling platform 100 includes five connected rolling pallet trays, the modular rolling platform may carry up to five pallets. Likewise, if the modular rolling platform 100 includes six rolling pallet trays interlocked together, the modular rolling platform can transport six pallets simultaneously.

A set of linking mechanisms includes one or more connector devices for interlinking each rolling pallet tray to one or more rolling pallet trays in some example. For example, the first rolling pallet tray 102 is connected to the second rolling pallet tray 104 via a connector device 110 attached to a portion of a side 144 of the first rolling pallet tray and a portion of a side 146 of the second rolling pallet tray 104.

The second rolling pallet tray 104 in this example is connected to the fourth rolling pallet tray 108 via a connector 138. The fourth rolling pallet tray 108 may be interlinked with the third rolling pallet tray via a connector device 136. The third rolling pallet tray 106 may be connected to the first rolling pallet tray 102 via a connector device 134, for example.

The first rolling pallet tray 102 when interlinked with the second rolling pallet tray 104 and the third rolling pallet tray in this example pivots together with the second rolling pallet tray 104 and the third rolling pallet tray 106 as a single unit. This prevents the first rolling pallet tray 102 from turning, pivoting, rotating, twisting, or otherwise moving in opposition to the second rolling pallet tray 104 and the third rolling pallet tray 106.

Likewise, the fourth rolling pallet tray 108 when interlinked with the second rolling pallet tray 104 and the third rolling pallet tray 106 in this example pivots together with the second rolling pallet tray 104 and the third rolling pallet tray 106 as a single unit. This prevents the fourth rolling pallet tray 108 from turning, pivoting, rotating, twisting, or otherwise moving in opposition to the second rolling pallet tray 104 and the third rolling pallet tray 106.

Each individual rolling pallet tray in the modular rolling platform 100 includes a set of rollers extending downward from a bottom surface of the modular rolling platform 100. A roller is a wheel or roller device. A roller may be implemented as a wheel on an axle, a caster, or any other type of roller device.

In some examples, the set of rollers are only capable of forward and backward motion. In other examples, the set of rollers are swivel rollers capable of moving front-to-back, side-to-side, or any other direction. For example, a roller in the set of rollers may can turn about an axis clockwise or counter-clockwise three-hundred and sixty degrees. This enables the modular rolling platform 100 to turn, maneuver, and otherwise roll in any direction.

The set of rollers on each rolling pallet tray may include one or more rollers. In this example, rollers 120 and 122 are shown on the first rolling pallet tray 102, rollers 124, 126, and 128 are shown on the third rolling pallet tray 106, and rollers 130 and 132 are shown on the fourth rolling pallet tray 108. The second rolling pallet tray 104 may also include a set of one or more rollers (not shown) in this example.

The individual rolling pallet trays 102, 104, 106, and/or 108 in some examples are lightweight and stackable in a column configuration when empty. This enables the rolling pallet trays to be easily stacked for storage and/or return to a distribution center.

In these examples, the modular rolling platform 100 may include a set of slots within the rectangular base member of each individual rolling pallet tray. The set of slots in this example includes slot 112, slot 114, slot 116, and slot 118 in the first rolling pallet tray 102. Each slot in this non-limiting example is a substantially round or ovoid shaped slot, channel, or cut-out through the rectangular base member configured to accommodate a roller attached to another rolling pallet tray. In other words, each slot defines an open space having a radius or dimensions sufficient to accommodate at least one roller on another rolling pallet tray. For example, the width of a slot may be equal to or greater than a width of a roller.

The set of slots enables a plurality of rolling pallet trays to be stacked or nested in a vertical column when the rolling pallet trays are empty (no pallets on top of the rolling pallet trays). In one example, if the first rolling pallet tray 102 is detached from the modular rolling platform 100, inverted (up-side-down) and laid on a substantially horizontal surface, such as a floor. The second rolling pallet tray 104 may be detached from the modular rolling platform 100 and stacked vertically on top of the first rolling pallet tray 102. When stacked vertically, the set of rollers on the first rolling pallet tray 102 fits inside the openings defined by the set of slots in the second rolling pallet tray 104. The set of slots in the second rolling pallet tray 104 in this example includes slot 148, 150, 152, and 154.

Each rolling pallet tray in this example includes a slot to accommodate each wheel on a corresponding rolling pallet tray when stacked. Thus, if each rolling pallet tray includes four wheels, each rolling pallet tray also includes four slots. Likewise, if each rolling pallet tray include six wheels/rollers, each rolling pallet tray also includes six slots to accommodate the six wheels on the corresponding rolling pallet tray when arranged in a stacked configuration.

Each slot, such as slot 114, in this example is an aperture, hole, or opening sized to accommodate a roller/wheel on another rolling pallet tray. In other examples, the slot may be a depression, recess, niche, cavity, or housing sized to enclose a wheel/roller on another rolling pallet tray. In other words, when stacked, each roller on one rolling pallet tray slides into a slot on a corresponding rolling pallet tray.

Each upper surface of a rolling pallet tray is configured to conform to the size, shape and contours of a bottom (underside) surface of another rolling pallet tray when stacked. For example, if the third rolling pallet tray 106 is stacked upside down on top of the second rolling pallet tray, the third rolling pallet tray 106 conforms to the contours/shape of the underside of the second rolling pallet tray. The set of rollers associated with the second rolling pallet tray fits within an open space, cavity, aperture, or channel defined by the set of slots in the third rolling pallet tray 106.

In other examples, the modular rolling platform 100 may include one or more floor-lock brakes, such as floor-lock brake 140 in the third rolling pallet tray 106 and the floor-lock brake 142 on the fourth rolling pallet tray 108.

The floor-lock brake 140 may be mounted flush to an underside of the third rolling pallet tray 106 or side-mounted to a portion of a side of the third rolling pallet tray 106. The floor-lock brake 140 in this example is extended or folded down in a locked or activated state stopping movement of the rollers 124, 126, and/or 128. Because all interlinked rolling pallet trays pivot and move together as a single unit, the floor-lock brake 140 is engaged to stop movement of all the connected individual rolling pallet trays in the modular rolling platform 100 in this example.

The floor-lock brake 142 in some examples is a hinged leg floor-lock brake in a folded-up position/brake released (unengaged brake) position such that the floor-lock brake 142 is not in contact with the floor or other horizontal surface in contact with the set of rollers. The floor-lock brake 142 is not actively stopping movement of the rollers in this folded-up position. In some examples, all the floor-lock brakes are de-activated/retracted or folded up to enable the modular rolling platform to move/roll/maneuver to a new location or position. Likewise, one or more of the floor-lock brakes may be folded down or engaged to park or stop movement of the modular rolling platform.

Parking the modular rolling platform may be done for purposes of attaching another rolling pallet tray to the modular rolling platform 100, detaching a rolling pallet tray from the modular rolling platform 100 or parking a partially or completely loaded modular rolling platform in a loading area or on a transportation vehicle. A transportation vehicle may include a trailer, a truck, a van, a cargo plane, a freight car of a train, a cargo ship, a shipping crate, or any other type of vehicle or container for moving pallets.

Figure 2:
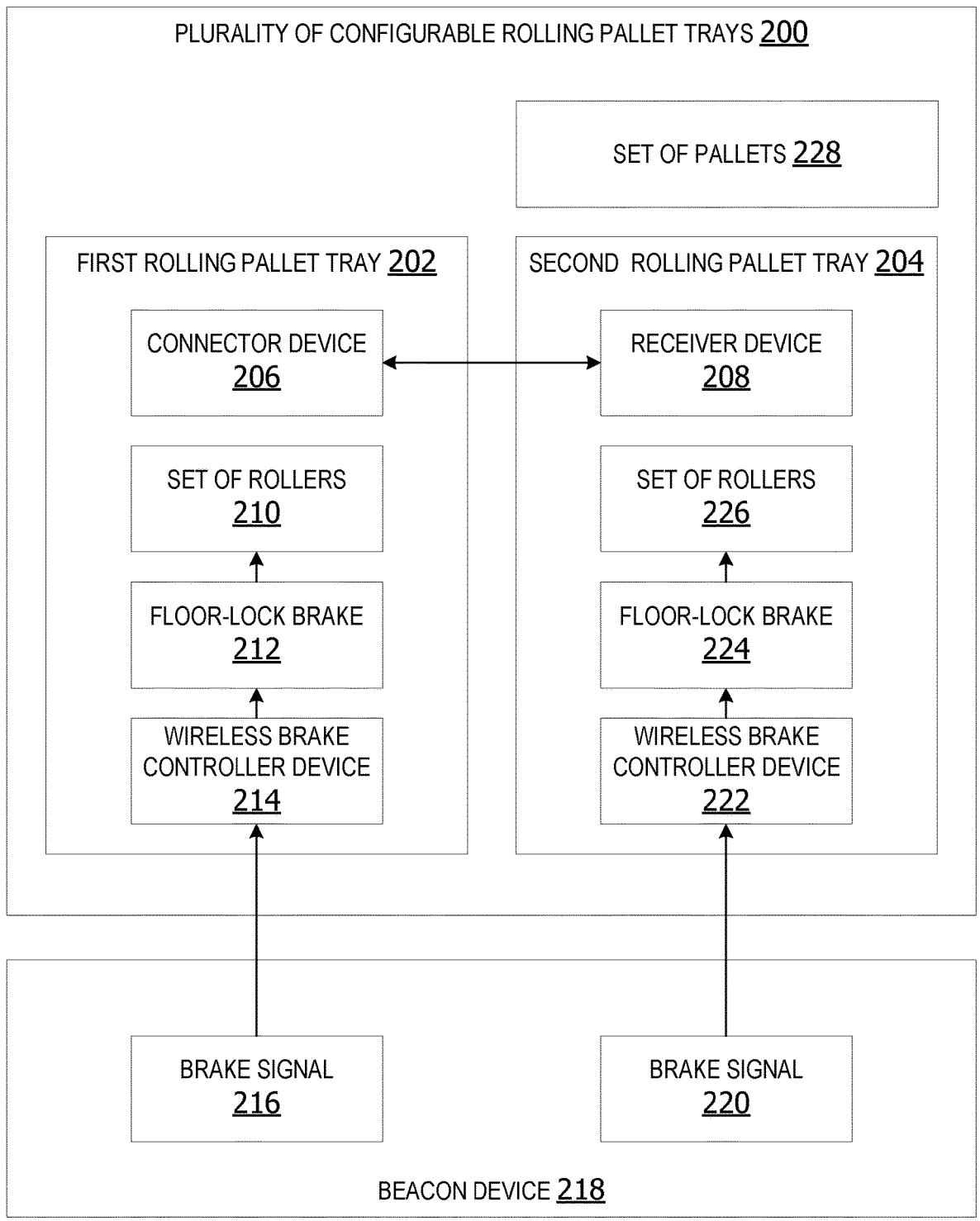
FIG. 2 is an exemplary block diagram illustrating a plurality of configurable rolling pallet trays.

FIG. 2 is an exemplary block diagram illustrating a plurality of configurable rolling pallet trays. The plurality of configurable rolling pallet trays 200 includes a first rolling pallet tray 202 and a second rolling pallet tray 204 interconnected together for transporting a set of one or more pallets 228. The first rolling pallet tray 202 in the plurality of configurable rolling pallet trays 200 includes a connector device 206 attached to a portion of the first rolling pallet tray 202. The connector device 206 is removably attached to a receiver device 208 on a portion of the second rolling pallet tray 204. The first rolling pallet tray 202 pivots together with the second rolling pallet tray 204 as a single unit when the first rolling pallet tray 202 is removably connected to the second rolling pallet tray 204 via the connector device 206 and the complementary receiver device 208.

The first rolling pallet tray 202 may include a set of one or more rollers 210 pivotally mounted to a portion of the first rolling pallet tray 202. In some examples, the set of rollers 210 are mounted to an underside or bottom portion of the first rolling pallet tray 202. The set of rollers 210 in some examples includes an even number of rollers mounted an equal distance apart from each other for improved stability. For example, the set of rollers 210 may include, without limitation, four rollers, six rollers, eight rollers or ten rollers.

In one example, the set of rollers 210 includes four rollers attached at each corner of the first rolling pallet tray 202. The set of rollers 210 in this example are in normal contact with the floor, a ramp, or the ground.

At least one floor-lock brake 212 is associated with at least one roller in the set of rollers 210. The floor-lock brake 212 may be mounted on a bottom surface of the first rolling pallet tray 202, a side portion of the first rolling pallet tray 202 or attached to one or more rollers in the set of rollers 210. The floor-lock brake 212 is configured to stop movement of at least one roller in the set of rollers upon activation of the floor-lock brake. The floor-lock brake 212 may be implemented as a hinged leg, an attached chock, or any other type of brake. The floor-lock brake 212 may be a manual braking mechanism engaged by a user or an automatic braking mechanism engaged by a wireless brake controller device 214.

The wireless brake controller device 214 is a device for receiving a brake signal 216 from a signal generating device, such as a beacon device 218. A beacon device 218 is a device for generating a beacon signal, such as, but not limited to, a BLUETOOTH brand communication module, a radio frequency identification (RFID) transmitter, a light beacon, a radio signal transmitter, near-field communication (NFC) tags, or any other type of signal device. In some examples, the beacon device 218 is a low-power, short range beacon transmission device.

The wireless brake controller device 214 in these examples does not detect the brake signal 216 unless the beacon device 218 is within a beacon detection range or zone. The beacon detection range is a predetermined distance from the wireless brake controller device 214 at which the wireless brake controller device 214 can detect or receiving the brake signal 216 from the beacon device 218.

The brake signal 216 may include a brake-activation signal to engage/trigger activation of the floor-lock brake 212. The brake signal 216 in other examples may be a brake release signal to disengage ore de-activate the floor-lock brake 212. The wireless brake controller device 214 receives the brake signal 216 from the beacon device 218 when the wireless brake controller device 214 is within range of the beacon device 218.

If the brake signal 216 is an activation signal, the floor-lock brake 212 engages a brake and stops one or more rollers in the set of rollers 210 from turning. If the brake signal 216 received from the beacon device 218 is a brake release signal, the wireless brake controller device 214 triggers the floor-lock brake 212 to disengage and permit all the rollers in the set of rollers to turn/rotate.

In some examples, the beacon device 218 may send a brake signal 220 to a wireless brake controller device 222 associated with the second rolling pallet tray 204. If the brake signal 220 is a brake release signal, the floor-lock brake 224 releases, allowing the rollers in the set of rollers 226 to turn. If the brake signal 220 is a brake-activation signal, the wireless brake controller device 222 triggers the floor-lock brake 224 to engage and stop the second rolling pallet tray 204 from moving.

Figure 3:
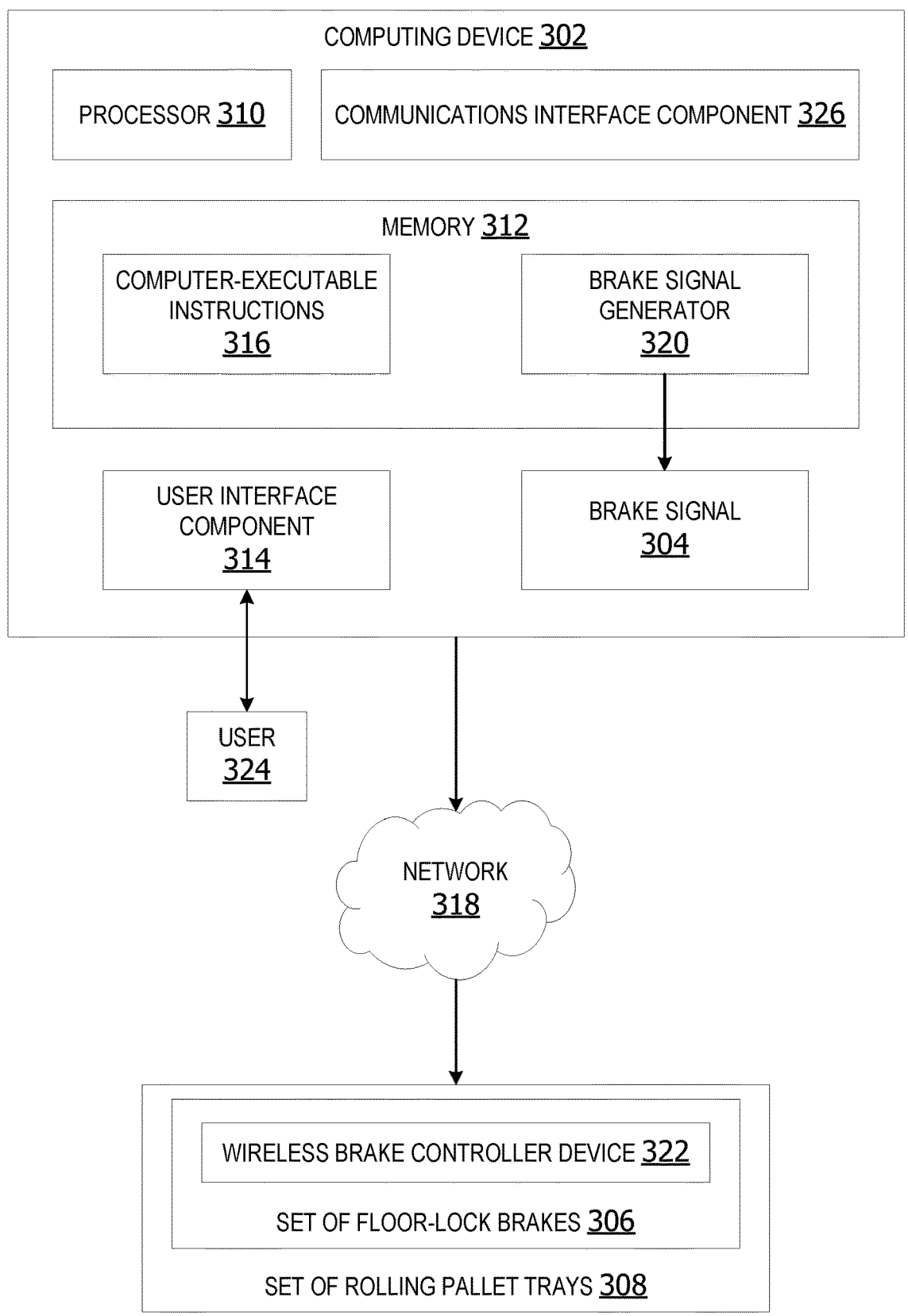
FIG. 3 is an exemplary block diagram illustrating a rolling platform system for wirelessly engaging a set of floor-lock brakes.

FIG. 3 is an exemplary block diagram illustrating a rolling platform system for wirelessly engaging a set of floor-lock brakes. The system 300 in some examples includes a computing device 302 for generating a brake signal 304 to wirelessly activate or de-activate a set of floor-lock brakes 306 associated with a set of rolling pallet trays 308. The computing device 302 represents any device executing instructions (e.g., as application programs, operating system functionality, or both) to implement the operations and functionality associated with the computing device 302. The computing device 302 in this example is a mobile computing device or other portable device. In some examples, the mobile computing device includes a mobile telephone, laptop, tablet, computing pad, netbook, gaming device, and/or portable media player. The computing device 302 in other examples may also include less portable devices such as desktop personal computers, kiosks, tabletop devices, industrial control devices, wireless charging stations, and electric automobile charging stations. Additionally, the computing device 302 may represent a group of processing units or other computing devices.

In some examples, the computing device 302 has at least one processor 310, a memory 312, and at least one user interface component 314. The processor 310 includes any quantity of processing units and is programmed to execute computer-executable instructions 316. The computer-executable instructions 316 may be performed by the processor 310 or by multiple processors within the computing device 302 or performed by a processor external to the computing device 302. In some examples, the processor is programmed to execute instructions such as those illustrated in the figures (e.g., FIG. 16 and FIG. 17).

The computing device 302 further has one or more computer readable media such as the memory 312. The memory 312 includes any quantity of media associated with or accessible by the computing device 302. The memory 312 may be internal to the computing device 302 (as shown in FIG. 3), external to the computing device (not shown), or both (not shown). In some examples, the memory 312 includes read-only memory and/or memory wired into an analog computing device.

The memory 312 stores data, such as one or more applications. The applications, when executed by the processor 310, operate to perform functionality on the computing device 302. The applications may communicate with counterpart applications or services such as web services accessible via a network. For example, the applications may represent downloaded client-side applications that correspond to server-side services executing in a cloud.

The network 318 is implemented by one or more physical network components, such as, but without limitation, routers, switches, network interface cards (NICs), and other network devices. The network 318 may be any type of network for enabling communications with remote computing devices, such as, but not limited to, a local area network (LAN), a subnet, a wide area network (WAN), a wireless (Wi-Fi) network, or any other type of network. In this example, the network 318 is a WAN accessible to the public, such as the Internet.

The memory further stores a brake signal generator 320. The brake signal generator 320 component, when executed by the processor 310 of the computing device 302, causes the processor 310 to generate a brake signal 304 in response to receiving user input via the user interface component 314. The brake signal 304 may be a brake-activation signal to engage the set of floor-lock brakes 306 or a brake release signal to disengage the set of floor-lock brakes 306.

In some examples, the brake signal generator 320 receives user input from a user 324 via the user interface component 314 indicating whether the user 324 wants to engage or disengage the set of floor-lock brakes 306. In response to the user input, the brake signal generator 320 generates the brake signal 304.

In other examples, the brake signal 304 does not indicate whether to engage the floor brakes or disengage the floor brakes. Instead, the brake signal 304 triggers the floor lock brakes to engage if the floor-lock brakes are disengaged when the brake signal 304 is received, for example. If the floor-lock brakes in this example are already engaged when the brake signal 304 is received by the wireless brake controller device 322, the wireless brake controller device 322 triggers the set of floor-lock brakes to release.

In some examples, the user interface component 314 includes a graphics card for displaying data to the user and receiving data from the user. The user interface component 314 may also include computer-executable instructions (e.g., a driver) for operating the graphics card. Further, the user interface component 314 may include a display (e.g., a touch screen display or natural user interface) and/or computer-executable instructions (e.g., a driver) for operating the display. The user interface component 314 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a selected manner (one or more movements).

In some examples, a communications interface component 326 includes a network interface card and/or computer-executable instructions (e.g., a driver) for operating the network interface card. Communication between the computing device 302 and other devices may occur using any protocol or mechanism over any wired or wireless connection. In some examples, the communications interface component 326 is operable with short range communication technologies such as by using NFC tags.

FIG. 4 is an exemplary block diagram illustrating an individual rolling pallet tray. An individual rolling pallet tray 400 in some examples includes a rectangular base member 402. The rectangular base member 402 may include a top surface 404, a bottom surface 406, and a set of four sides 408. The top surface 404 includes a surface area 410 that is greater than or equal to a surface area of a base of a pallet 412. In other words, the surface area 410 is sufficient to accommodate a single pallet 412 resting on the top surface 404 of the individual rolling pallet tray 400.

The pallet 412 may be a single-order pallet or a mixed freight pallet. The pallet 412 may include a pallet or a skid.

In some examples, the top surface 404 includes a lip 414 extending upward along a circumference 416 of at least a portion of the top surface 404. The lip 414 assists with stabilizing the pallet 412 resting on the top surface 404. The lip 414 prevents the pallet 412 from sliding off the top surface 404 of the individual rolling pallet tray 400 while the individual rolling pallet tray 400 is in motion. For example, if the individual rolling pallet tray is being pulled up a ramp or lowered down a ramp, the lip 414 prevents the pallet 412 from sliding off the individual rolling pallet tray 400.

In another example, the top surface 404 may include a non-slip surface. The non-slip surface may include bumps, ridges, or other texture to prevent slippage of objects in contact with the top surface 404.

The bottom surface 406 in some examples includes a set of rollers 418. In some examples, the set of rollers 418 is pivotally mounted to the bottom surface 406 of the rectangular base member 402. In other examples, the one or more rollers in the set of rollers 418 may be mounted to a portion of a side of the individual rolling pallet tray 400.

In some examples, at least one floor-lock brake 420 is attached to at least one roller in the set of rollers 418. In other examples, the floor-lock brake 420 is mounted or attached to the bottom surface 406 of the rectangular base member 402. The floor-lock brake 420 is configured to stop movement of at least one roller in the set of rollers upon activation of the floor-lock brake 420.

A set of linking mechanisms 422 in some examples is attached to at least one side in the set of four sides 408. The set of linking mechanisms 422 includes a connector device 424 attached to or extending from a portion first side 426 in the set of four sides 408. The set of linking mechanisms 422 in these non-limiting examples includes a receiver device 428 attached to or extending from a portion of a second side 430 in the set of four sides 408. The receiver device 428 is associated with the side 430 opposite to the side 426 associated with the connector device 424.

The connector device 424 is configured to removably attach to a receiver device attached to a portion of a side of the second rolling pallet tray or extending from a portion of the side of the second rolling pallet tray, such as, but not limited to, the second rolling pallet tray 204 in FIG. 2. The first rolling pallet tray moves together with the second rolling pallet tray as a single unit when the first rolling pallet tray is interlinked to the second rolling pallet tray via the set of linking mechanisms 422.

The individual rolling pallet tray 400 may also include a set of slot members 432 within the rectangular base member 402 of the individual rolling pallet tray 400. The set of slot members 432 are configured to accommodate a set of rollers on another rolling pallet tray when the rolling pallet trays are stacked.

Figure 5:
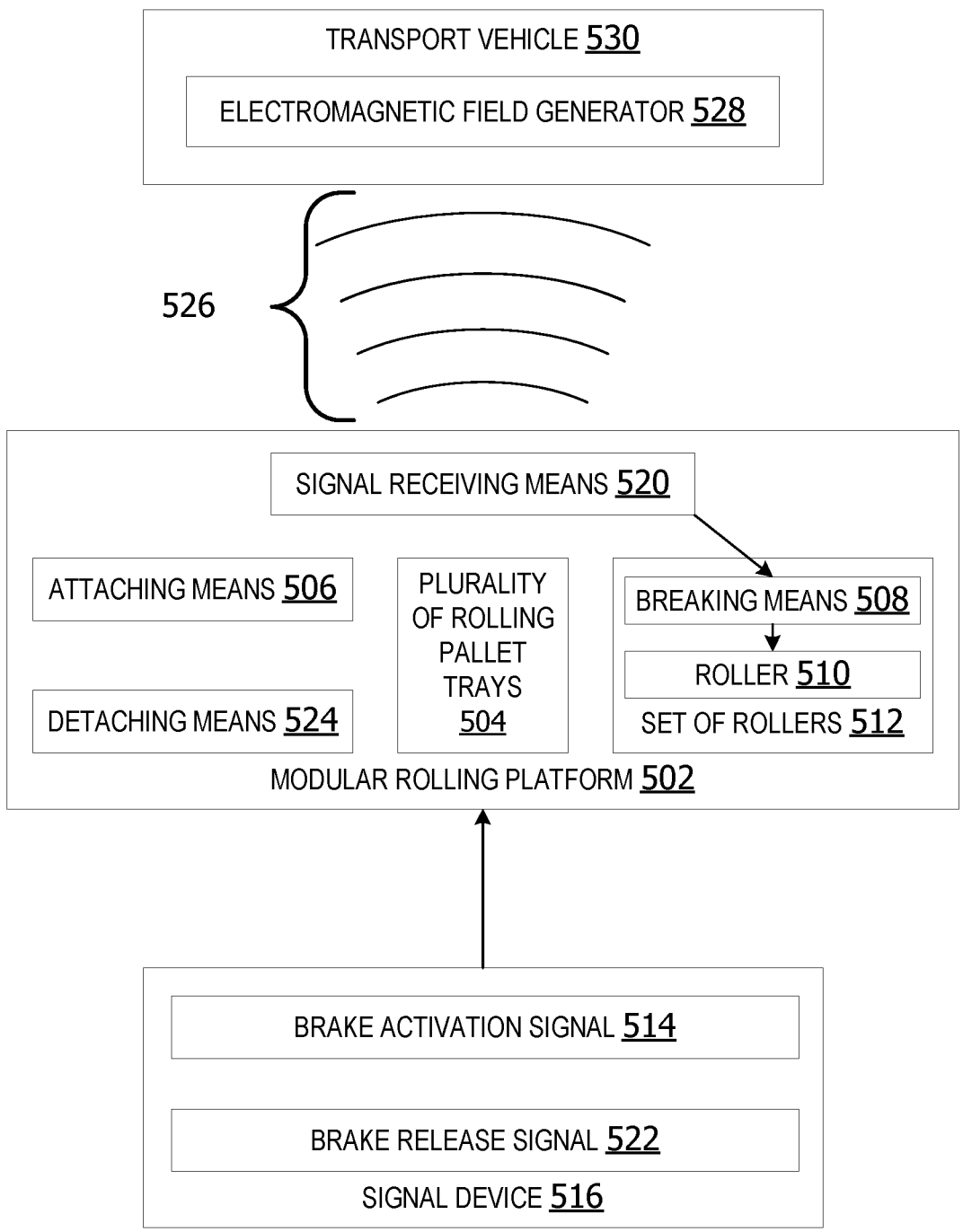
FIG. 5 is an exemplary block diagram illustrating braking means for a modular rolling platform.

FIG. 5 is an exemplary block diagram illustrating braking means for a modular rolling platform 502. The modular rolling platform 502 in some examples includes a plurality of rolling pallet trays 504 connected via attaching means 506. The attaching means 506 may link two or more individual rolling pallet trays together in a plurality of different configurations.

The attaching means 506 may be implemented as any type of device for connecting at least one side of a selected individual rolling pallet tray to at least one side of at least one other individual rolling pallet tray in the plurality of rolling pallet trays 506, such as, but not limited to, the connector devices 110, 134, 136, and 138 in FIG. 1, the connector device 206 in FIG. 2, the receiver device 208 in FIG. 2, and/or the set of linking mechanisms 422 in FIG. 4. For example, the attaching means 506 may be implemented as a tongue-in-groove linking mechanism, a spring-loaded pin and socket device, a hook and ring device, or any other type of attaching means. In another example, the attaching means 506 may include a spring-loaded pin and locking mechanism that latches and locks when two rolling pallet trays are pushed together.

A braking means 508 in some examples is provided for stopping movement of at least one roller 510 in the set of rollers 512 associated with at least one individual rolling pallet tray in the plurality of rolling pallet trays 504 in response to receiving a brake-activation signal 514 from a signal device 516. The signal device 516 is any type of device for sending a brake signal, such as the beacon device 218 in FIG. 2 and/or brake signal generator 320 associated with the computing device 302 in FIG. 3.

A signal receiving means 520 is a device for receiving the brake-activation signal 514 and/or a brake release signal 522 from the signal device 516. The signal receiving means 520 may be implemented as any type of device for detecting or receiving brake signals, such as, but not limited to, wireless brake controller device 214 or 222 in FIG. 2, and/or the wireless brake controller device 322 in FIG. 3.

The signal receiving means 520 may include a BLUETOOTH brand communication module, a radio frequency identification (RFID) tag reader, a beacon receiver, a radio signal receiver, etc.

In some examples, the signal receiving means 520 engages the braking means 508 to stop movement of the modular rolling platform 502 upon receipt of the brake-activation signal 514 by the signal receiving means 520. The signal receiving means in other examples disengages the braking means to permit movement of the modular rolling platform 502 upon receipt of the brake release signal 522 by the signal receiving means 520.

The modular rolling platform 502 may include detaching means 524 for disconnecting a selected individual rolling pallet tray from the plurality of rolling pallet trays 504 in the modular rolling platform 502. The detaching means 534 may include any type of device for de-activating a brake, such as, but not limited to, the wireless brake controller device 214 or 222 in FIG. 2, the wireless brake controller device 322 in FIG. 3, and/or the set of linking mechanisms 422 in FIG. 4.

In other examples, the signal receiving means 520 includes a device for detecting an electromagnetic field 526 generated by an electromagnetic field generator 528. The electromagnetic field may be generated to trigger activation of the braking means 508.

Upon detecting the electromagnetic field 526, in some examples, the signal receiving means 520 engages the braking means 508 to stop the set of rollers 512 from rolling and hold the modular rolling platform 502 in place. Upon detecting the absence of the electromagnetic field 526, the signal receiving means in this example releases the braking means 508 enabling the modular rolling platform 502 to be rolled to a new location. Thus, the electromagnetic field generator 528 may be utilized to wirelessly engage and disengage the braking means from a remote location, such as an interior or exterior of a transport vehicle 530. The transport vehicle 530 may include a truck, trailer, van, cargo ship, cargo plane, or any other type of container or vehicle for moving goods from a point of departure to a destination.

In this example, the transport vehicle 530 includes the electromagnetic field generator 528. In other examples, the transport vehicle 530 includes the signal device 516. In still other examples, the electromagnetic field generator 528 is located within a loading area for loading goods/pallets onto a transport vehicle and/or an unloading area for unloading pallets from a transport vehicle 530.

In some examples, the set of rollers include electronic locking wheels. The electronic locking wheels activate in the presence of the electromagnetic field 526 and/or in response to receipt of a brake-activation signal.

In other examples, the floor-lock brake is a pin and socket brake mechanism. The electromagnetic field triggers the pin and socket brake mechanism to drop a pin into a socket of the transport vehicle 530 to lock the rolling platform tray in place.

Figure 6:
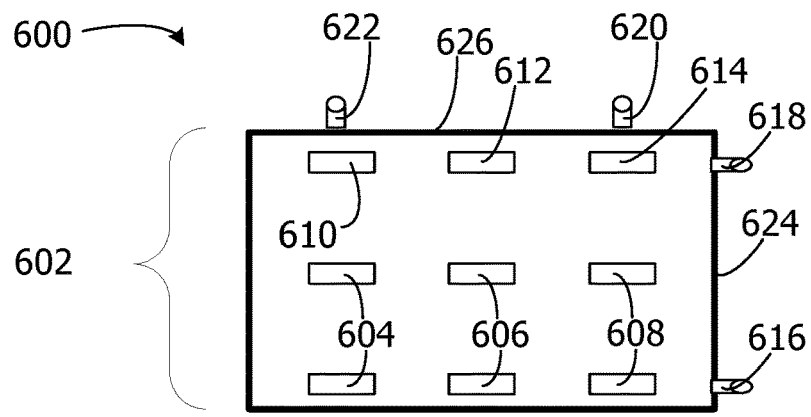
FIG. 6 is a plan view of an individual rolling pallet tray.

FIG. 6 is a plan view of an individual rolling pallet tray. The rolling pallet tray 600 includes a rectangular base member 602 having a top surface area that is greater than or equal to a surface area of a base of an individual pallet. In some examples, the rectangular base member 602 includes a set of slot members, such as the set of slots 112, 114, and 116 in FIG. 1 and/or the set of slot members 432 in FIG. 4. In this non-limiting example, the set of slot members includes slots 604, 606, 608, 610, 612, and 614. Each slot in the set of slot members have equal dimensions. The dimensions of each slot are sufficient to permit a roller to slide through the channel when the rolling pallet tray 600 is stacked vertically on another rolling pallet tray.

The rolling pallet tray 600 in other examples includes a pair of connector devices 616 and 618 extending from a first side 624 of the rolling pallet tray 600. The pair of connector devices link with a pair of receiver devices extending from a side of second rolling platform tray to interlink the rolling pallet tray 600 with the second rolling platform tray.

The rolling pallet tray may also include another pair of connector device 620 and 622 extending from a second side 626 of the rolling pallet tray 600. The pair of connector devices 620 and 622 may optionally link with a pair of receiver devices extending from a side of third rolling platform tray to interlink the rolling pallet tray 600 with the third rolling platform tray.

Figure 7:
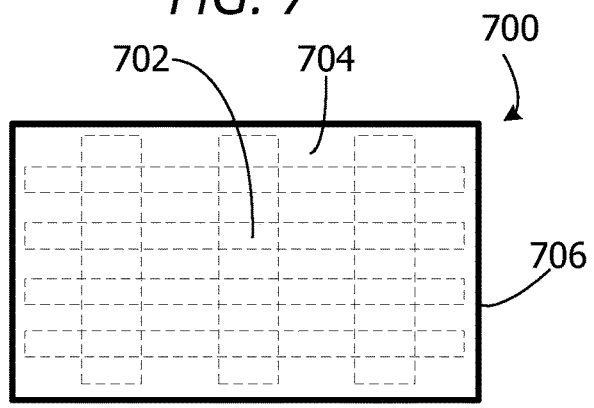
FIG. 7 is an exemplary plan view of an individual rolling pallet tray with a pallet support frame resting on a top surface of the rolling pallet tray.

FIG. 7 is an exemplary plan view of an individual rolling pallet tray with a pallet support frame resting on a top surface of the rolling pallet tray. The rolling pallet tray 700 in this example includes an empty pallet support frame 702. The pallet support frame may be made of wood. In this example, the empty pallet support frame 702 is resting on the top surface 704 of the rolling pallet tray 700. A lip 706 extends upwards along a circumference of the top surface 702. In this example, the lip 706 extends approximately one-inch high. In another example, the lip 706 extends approximately a half-inch high. In still another non-limiting example, the lip extends a one-fourth of an inch high. The lip prevents from pallet support frame 702 from sliding off the rolling pallet tray.

Figure 8:
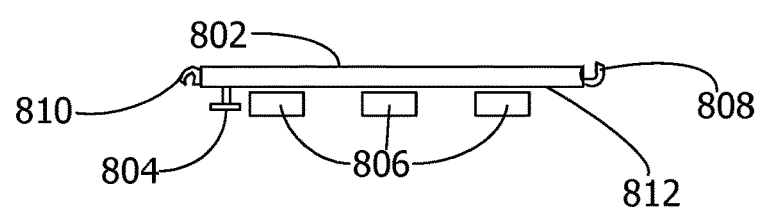
FIG. 8 is an exemplary elevation view of an individual rolling pallet tray.

FIG. 8 is an exemplary elevation view of an individual rolling pallet tray. The rolling pallet tray 800 includes a rectangular base member 802. A floor-lock brake 804 extends downward from a bottom surface 812 of the rolling pallet tray 800. In other words, the floor-lock brake 804 is flush mounted to the under-side of the rolling pallet tray. In other examples, the floor-lock brake may be a side mounted brake.

The floor-lock brake 804 in this non-limiting example is a spring-loaded floor lock. In other examples, the floor-lock brake 804 may be implemented as an adjustable height floor lock brake. The floor-lock brake 804 in this non-limiting example is manually engaged and/or manually disengaged. In other examples, the floor-lock brake may be automatically engaged or disengaged via a wireless brake controller device.

In this example, a set of rollers 806 are mounted on an underside of the rolling pallet tray 800. The set of rollers 806 may include a pair of rollers, four rollers, six rollers, as well as any other number of rollers.

A connector device 808 in this example is a "J" hook for securing to a receiver device on an adjacent rolling pallet tray. The receiver component 810 in this example is a complementary loop or latch for connecting to a connector device on an adjacent rolling pallet tray. When two rolling pallet trays are pushed together, the connector device 808 locks onto a receiver device on the adjacent rolling pallet tray. In other examples, when a rolling pallet tray is pushed up against the rolling pallet tray 800, the receiver device 810 locks onto the connector device on the adjacent rolling pallet device.

Figure 9:
FIG. 9 is an exemplary section view of an individual rolling pallet tray.

FIG. 9 is an exemplary section view of an individual rolling pallet tray. The rolling pallet tray 900 includes a rectangular base member 902. The rectangular base member 902 in this non-limiting example includes a lip 904 and 906 extending around the perimeter of the rectangular base member 902.

The rolling pallet tray 900 may be constructed of plastic, aluminum, a composite material, or any suitable material.

Figure 10:
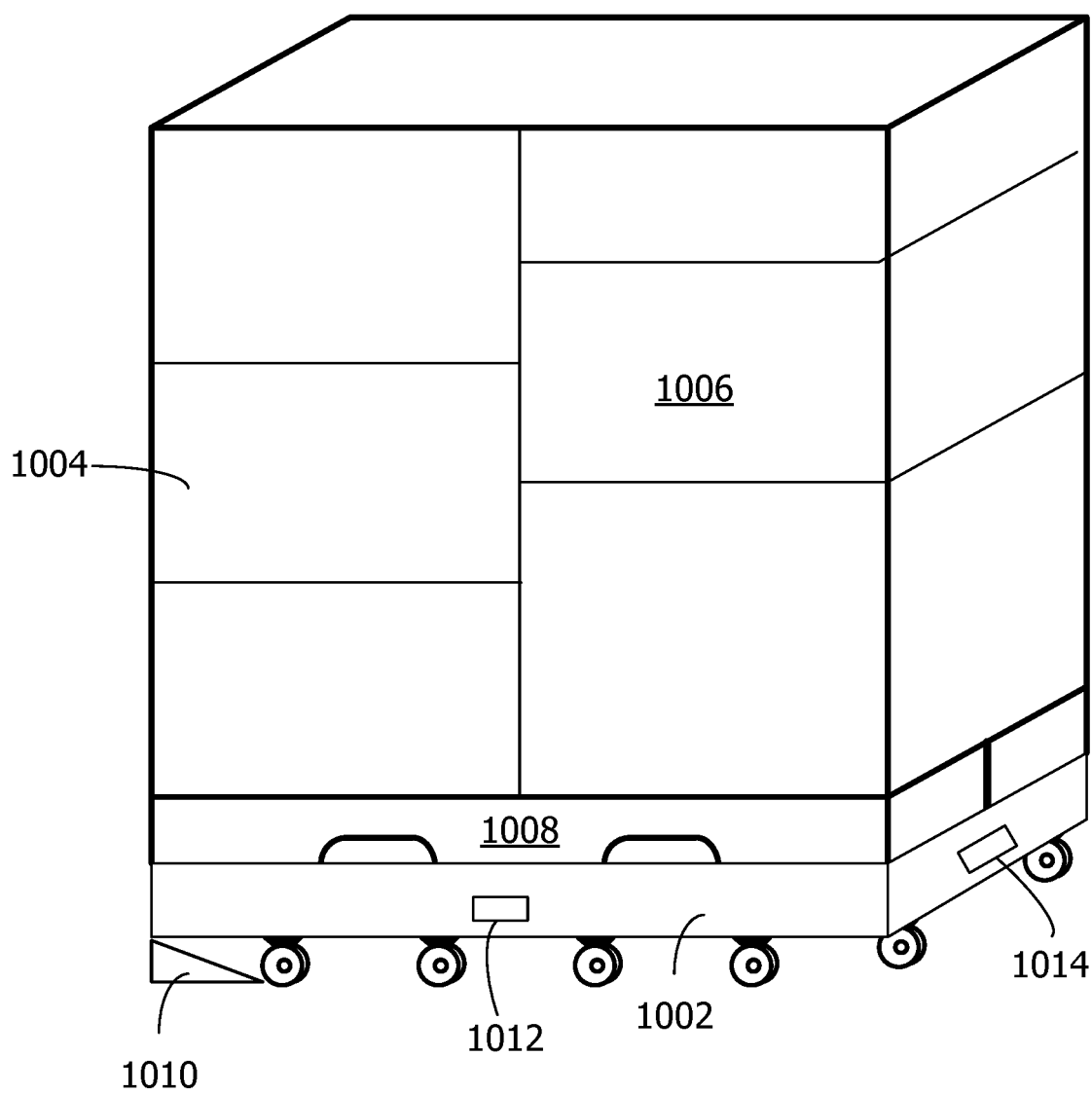
FIG. 10 is an exemplary perspective view of a rolling pallet tray including a pallet of items.

FIG. 10 is an exemplary perspective view of a rolling pallet tray including a pallet of items. The rolling pallet tray 1002 includes a pallet 1004. The pallet 1004 includes a unit load of goods 1006 supported on a flat, wooden, pallet transport structure 1008.

The braking mechanism in this non-limiting example is a chock 1010 connected to the rolling pallet tray 1002 by a chain, cord, cable, or other attachment means. The chock 1010 may be positioned at or near a roller to prevent the roller from turning or moving.

Triangular chocks, such as the chock 1010, may be used to secure the modular rolling platform inside a trailer or other transportation vehicle. The chock 1010 may be used alone or in combination with a floor-lock brake.

The rolling pallet tray 1002 in this example includes six rollers. In other examples, the rolling pallet tray 1002 may include two wheels, four wheels, eight wheels, or any other number of wheels (rollers). The rolling pallet tray 1002 includes a connector 1012 on a first side and connector 1014 on a second side for connecting the rolling pallet tray 1002 with one or more other rolling pallet trays to create multiple segmented rolling pallet tray configurations.

Figure 11:
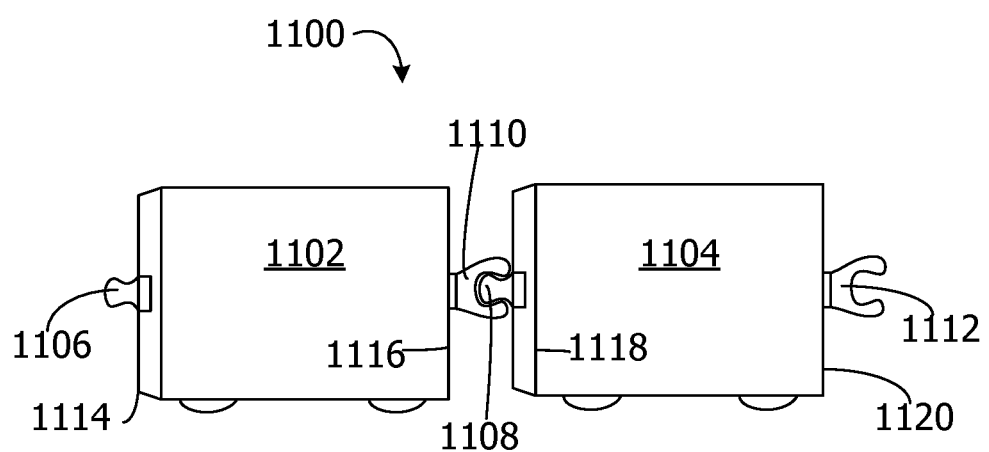
FIG. 11 is an exemplary plan view of a set of rolling pallet trays interlocked together via a set of linking mechanism.

FIG. 11 is an exemplary plan view of a set of rolling pallet trays interlocked together via a set of linking mechanism. The set of rolling pallet trays 1100 in this example includes a first rolling pallet tray 1102 and a second rolling pallet tray 1104. A connector device 1106 associated with a first side 1114 is capable of interlocking with a receiver device on another rolling pallet tray. A receiver device 1110 associated with a second side 1116 of the first rolling pallet tray 1102 is interlocked with a connector device 1108 associated with a first side 1118 of the second rolling pallet tray 1104. A receiver device 1112 associated with a second side 1120 of the second rolling pallet tray 1104.

The connector device 1108 and the receiver device 1110 in this non-limiting example is a type of tongue-in-groove linking mechanism. The tongue-in-groove linking mechanism is a horizontal coupling mechanism which prevents pivoting between the first rolling pallet tray 1102 and the second rolling pallet tray 1104.

Figure 12:
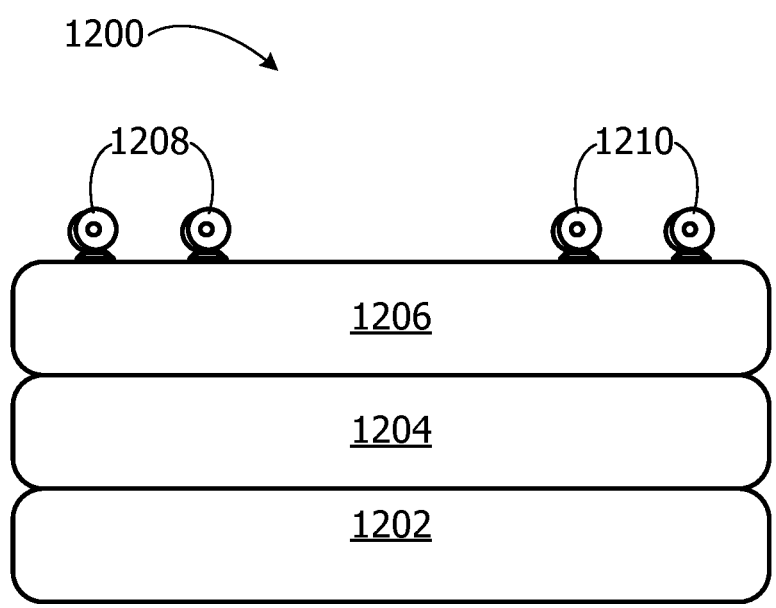
FIG. 12 is an exemplary block diagram of a stack of rolling pallet trays.

FIG. 12 is an exemplary block diagram of a stack of rolling pallet trays. The stack 1200 of rolling pallet trays includes a first rolling pallet tray 1202, a second rolling pallet tray 1204, and a third rolling pallet tray 1206. This non-limiting example shows three rolling pallet trays stacked vertically. However, the examples are not limited to stacking three rolling pallet trays. In other examples, any number of rolling pallet trays may be stacked.

In this example, the rolling pallet trays are turned upside down (inverted) such that the wheels 1208 and 1210 on the third rolling pallet tray 1206 are facing upward. If a fourth rolling pallet tray is added to the top of the stack, the wheels 1208 and 1210 of the third rolling pallet tray 1206 will slide into the set of slot members on the fourth rolling pallet tray to enable stacking/nesting of the rolling pallet trays.

Figure 13:
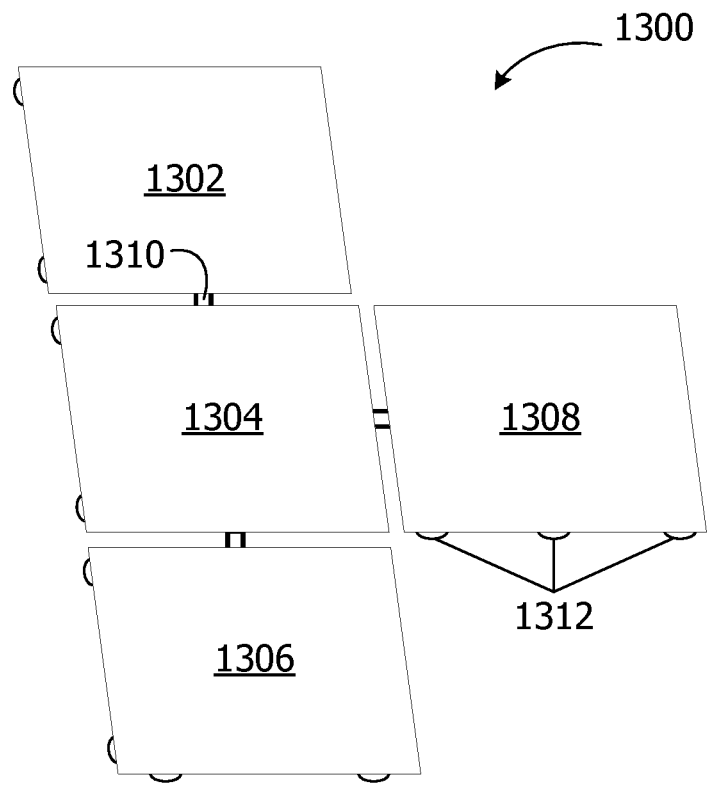
FIG. 13 is an exemplary block diagram of a configuration for four interlocked rolling pallet trays.

FIG. 13 is an exemplary block diagram of a configuration for four interlocked rolling pallet trays. The modular rolling platform 1300 in this example is a possible configuration for four interlocked rolling platform trays. A first rolling platform tray 1302 is interlinked with a second rolling platform tray 1304. The second rolling platform tray 1304 is interlinked with the first rolling platform tray 1302, a third rolling platform tray 1306, and a fourth rolling platform tray 1308. In this non-limiting example, the modular rolling platform 1300 can carry four pallets simultaneously.

The example shown in FIG. 13 is only one possible configuration for interlocking four rolling platform trays. The rolling pallet trays may be interlinked together along both the x-axis and the y-axis. Therefore, the first rolling pallet tray 1302, the second rolling pallet tray 1304, the third rolling platform tray 1306, and the fourth rolling pallet tray 1308 may be interlocked together in at least one-hundred sixty different rolling platform configurations in some examples. The number of differing configurations increases exponentially with each additional rolling pallet tray added to the modular rolling platform. In this non-limiting example, the first rolling pallet tray 1302 is connected to the second rolling pallet tray 1304 via a linking mechanism 1310.

In other examples, if the modular rolling platform 1300 includes only three interconnected rolling pallet trays, the three rolling pallet trays may be connected in a plurality of different configurations. For example, the first rolling pallet tray, the second rolling pallet tray, and the third rolling platform tray is capable of interlocking together in thirty-six different rolling platform configurations.

The dimensions of the first rolling pallet tray are substantially equivalent to the dimensions of every other rolling pallet tray in the modular rolling platform, in some examples. The top surface of the first rolling pallet tray 1302 and a top surface of the second rolling pallet tray 1304, for example, are substantially level when the first rolling pallet tray 1302 is attached to the second rolling pallet tray 1304.

In other examples, the size of all the rollers attached to every rolling pallet tray in the plurality of rolling pallet trays associated with the modular rolling platform is the same size. The uniform roller size, for example, gives the modular rolling platform a substantially level upper surface.

Likewise, each rolling pallet tray may include a set of one or more rollers. In this non-limiting example, the rolling pallet tray 1308 includes the set of rollers 1312. The set of rollers 1312 includes one or more rollers.

In still other examples, each rolling pallet tray in the modular rolling platform has a uniform height and/or clearance off the ground. The ground clearance is a distance "A" from the floor to a top surface of the modular rolling platform. In other words, each rolling pallet tray in the plurality of rolling pallet trays has an equivalent height and/or clearance off the ground.

In one example, the uniform ground clearance is one inch. In other examples, the uniform clearance is two inches. In still other examples, the ground clearance is one-and-a-half inches. The ground clearance in these examples may be s small/minimized in some examples to reduce the vertical height within a trailer or other storage area consumed by the modular rolling platform. Moreover, the uniform clearance, for example, enables a plurality of rolling pallet trays to be connected forming a modular rolling platform of substantially uniform height and substantially level top surface across the plurality of interconnected rolling pallet trays.

Figure 14:
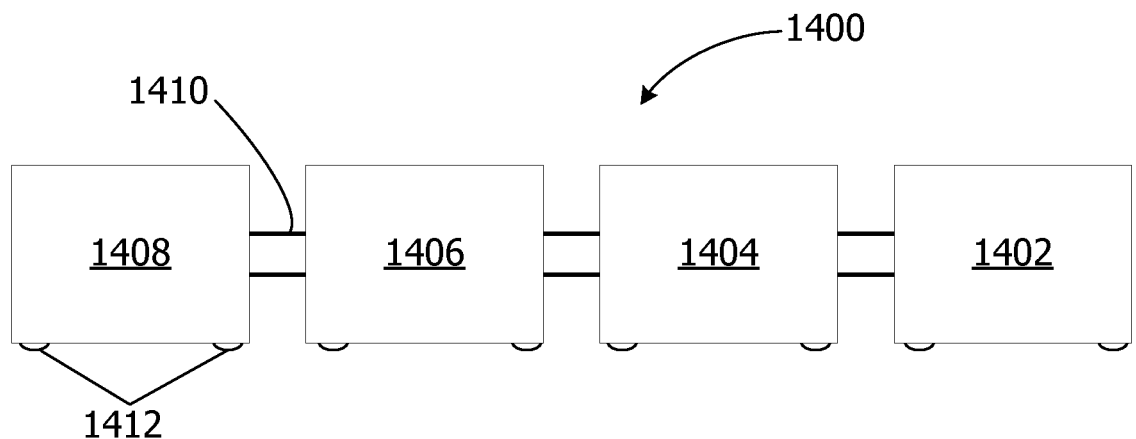
FIG. 14 is an exemplary block diagram of another configuration for four interlocked rolling pallet trays.

FIG. 14 is an exemplary block diagram of another configuration for four interlocked rolling pallet trays. The modular rolling platform 1400 in this example is a possible configuration for four interlocked rolling platform trays. A first rolling platform tray 1402 is interlinked with a second rolling platform tray 1404. The second rolling platform tray 1404 is interlinked with the first rolling platform tray 1402 and a third rolling platform tray 1406. The third rolling platform tray 1406 is interlinked with a fourth rolling platform tray 1408. In this non-limiting example, the modular rolling platform 1400 can carry four pallets simultaneously.

Each rolling platform in this example is connected to at least one other rolling platform via a set of linking mechanisms, such as, but not limited to, the linking mechanism 1410 connecting the fourth rolling platform tray 1408 to the third rolling platform tray 1406. Each rolling platform includes one or more rollers (wheels). For example, but without limitation, the fourth rolling platform in this example includes a set of wheels 1412.

Figure 15:
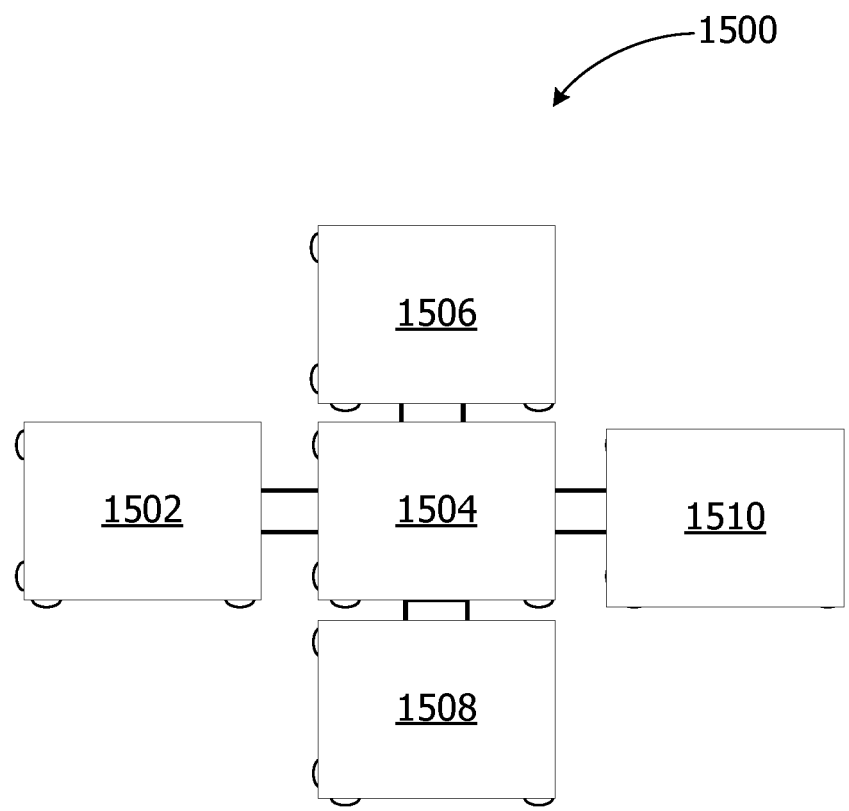
FIG. 15 is an exemplary block diagram of a configuration for five interlocked rolling pallet trays.

FIG. 15 is an exemplary block diagram of a configuration for five interlocked rolling pallet trays. The modular rolling platform 1500 in this example is a possible configuration for five interlocked rolling platform trays. A first rolling platform tray 1502 is interlinked with a second rolling platform tray 1504. The second rolling platform tray 1504 is interlinked with the first rolling platform tray 1502, a third rolling platform tray 1506, a fourth rolling platform tray 1508, and a fifth rolling platform tray 1510. In this non-limiting example, the modular rolling platform 1500 can carry five pallets simultaneously.

Figure 16:
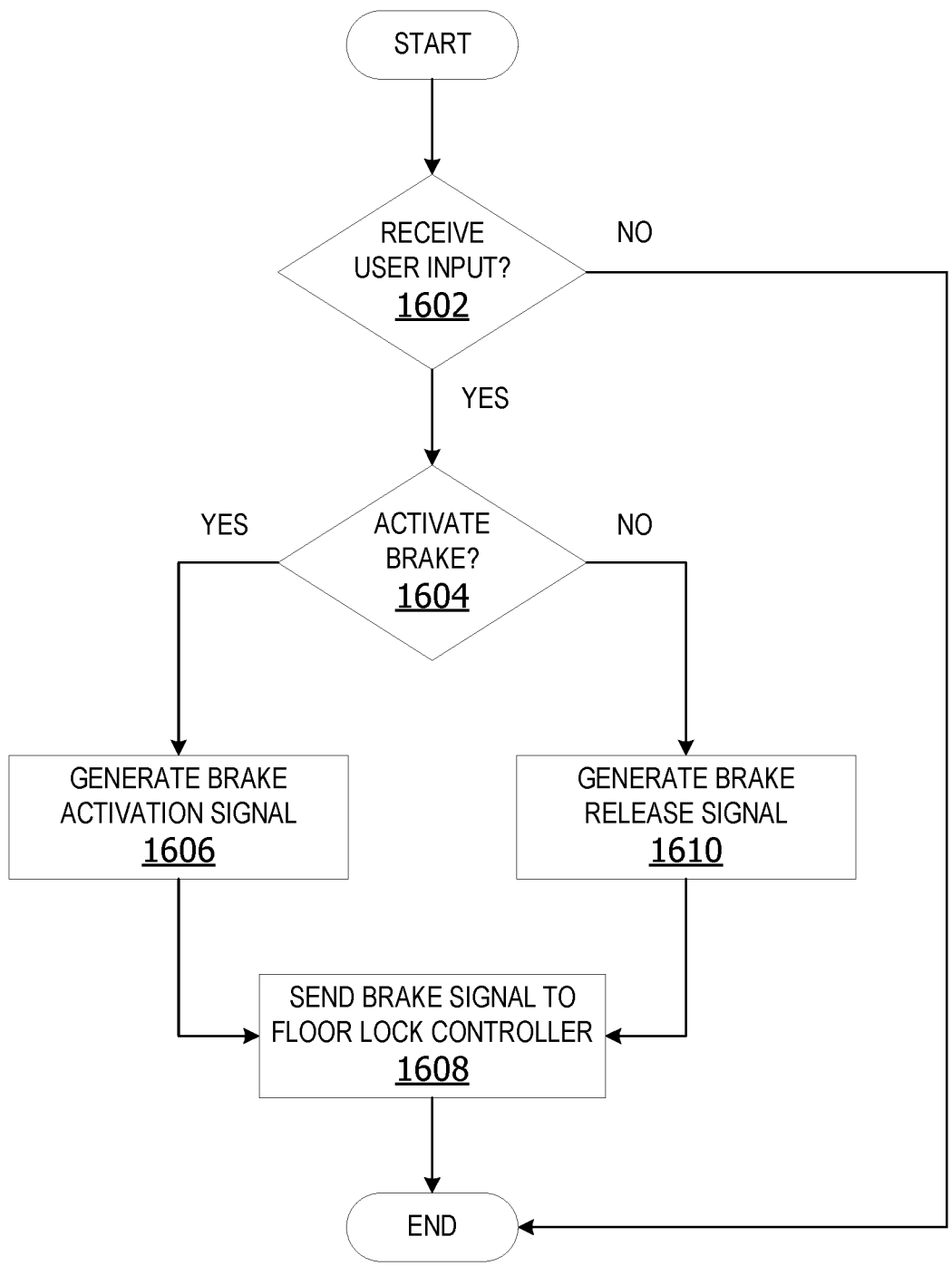
FIG. 16 is an exemplary flow chart illustrating operation of the computing device to activate or de-activate a set of brakes associated with a set of rolling pallet trays.

FIG. 16 is an exemplary flow chart illustrating operation of the computing device to activate or de-activate a set of brakes associated with a set of rolling pallet trays. The process shown in FIG. 16 may be performed by a brake signal generator component, executing on a computing device, such as the computing device 302 or the computing device 302 in FIG. 3.

The process begins by receiving user input at 1602. The user input may be received via a component, such as the user interface component 314 in FIG. 3 and/or the communications interface component 326 in FIG. 3. The brake signal generator determines whether the user input indicates brake activation at 1604. The brake signal generator is a component for generating brake activation or brake release signals, such as the brake signal generator 320 in FIG. 3. If yes, the brake signal generator generates a brake activation signal at 1606. The brake activation signal is a signal indicating brake activation, such as, but not limited to, the brake signal 304 in FIG. 3. The brake signal generator sends the brake signal to a floor-lock brake controller at 1608. The floor-lock brake controller is a device for activating or de-activating a brake on a rolling pallet tray, such as, but not limited to, the wireless brake controller device 322 in FIG. 3. The process terminates thereafter.

Returning to 1604, if the user input indicates brake release, the brake signal generator generates a brake release signal at 1610. The brake signal generator sends the brake signal to a floor-lock brake controller at 1608. The process terminates thereafter.

While the operations illustrated in FIG. 16 are performed by a computing device, aspects of the disclosure contemplate performance of the operations by other entities. For example, a cloud service may perform one or more of the operations.

Figure 17:
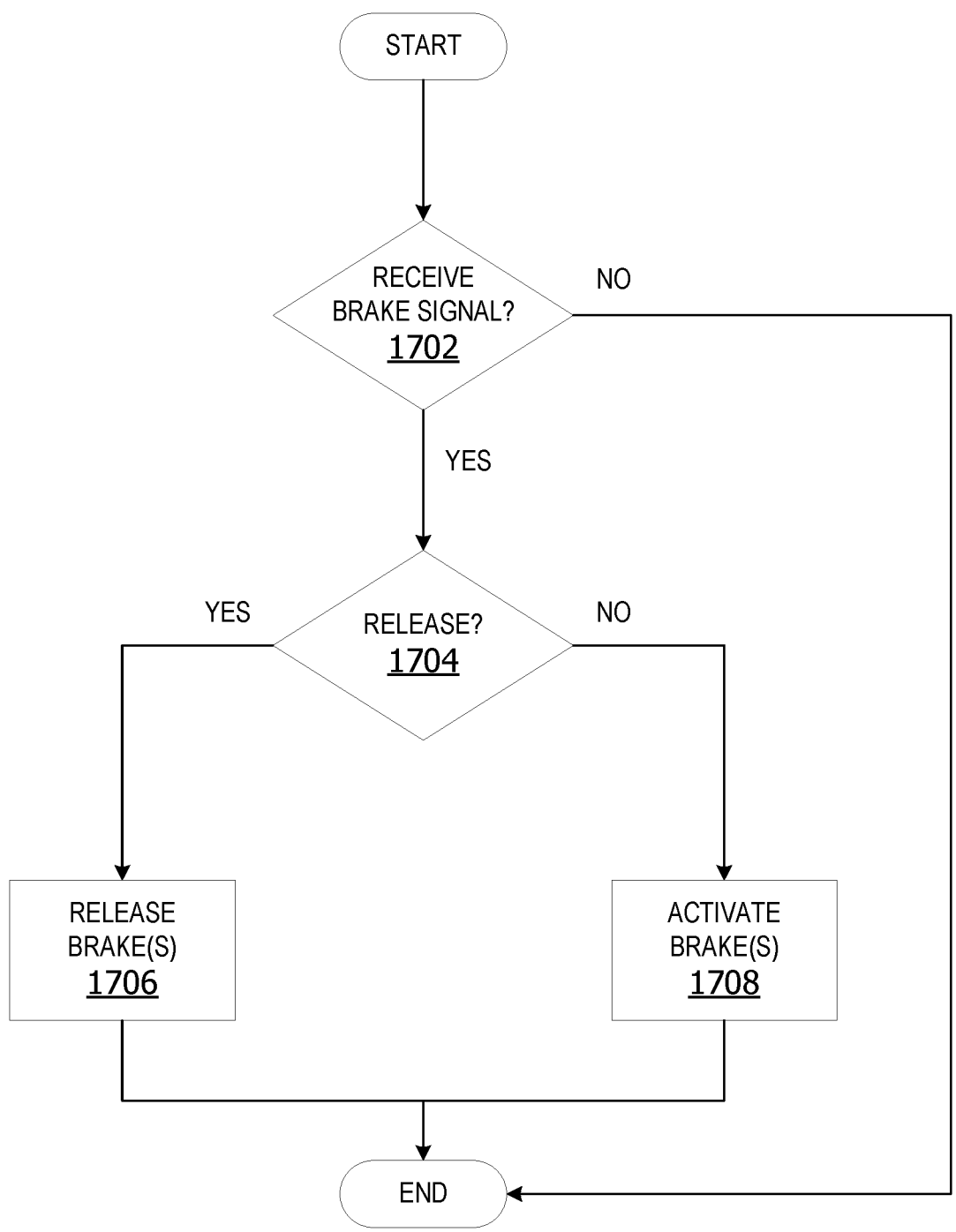
FIG. 17 is an exemplary flow chart illustrating operation of the computing device to activate or de-activate a set of brakes in response to receiving a brake signal.

FIG. 17 is an exemplary flow chart illustrating operation of the computing device to activate or de-activate a set of brakes in response to receiving a brake signal. The process shown in FIG. 17 may be performed by a wireless brake controller component, executing on a set of rolling pallet trays, such as the wireless brake controller device 322 in FIG. 3.

The process begins by determining if a brake signal is received at 1702. If yes, the wireless brake controller determines if the signal is a brake release signal at 1704. If yes, the wireless brake controller device releases one or more brake(s) associated with one or more rolling pallet trays in a set of rolling pallet trays at 1706. The process terminates thereafter.

Returning to 1704, if the brake signal is not a release signal at 1704, the signal is a brake activation signal. The wireless brake controller device activates one or more brake(s) at 1708. The process terminates thereafter.

Additional Examples

In other examples, each pallet loaded in a trailer is placed on a rolling pallet tray. The rolling pallet trays are interlocked both on the x-axis and y axis (side to side and front to back). The trailer may be unload all at once when the rolling pallet trays are all interlocked, by hooking to the last rolling pallet tray (at the door of trailer) and pulling out the modular rolling platform. The modular rolling platform enables improved load security/stability, so pallets will not slip or fall over because of the interconnection. The modular rolling platform also helps to load and unload trailers faster.

The rolling pallet trays may be used in some examples to pre-stage the footprint of the trailer on the loading area floor. In this manner, pallets do not have to be order-filled in the order they are loaded onto the trailer. Instead, pallets may be order-filled as items are ready. Loading floor access provides flexibility for staging and rearranging pallets on the rolling pallet trays. The rolling pallet trays may be configured and/or rearranged as they are loaded and ready. Once the entire trailer pallets are staged, the entire freight placed on the modular rolling platform may be loaded onto a trailer as a single unit, all at once.

In other examples, all pallets in a trailer may be unloaded at once as a set of rolling platform trays. This provides more flexibility to unload pallets in different order and configuration because the pallets are now all out of the trailer rather than being unloaded one by one. Individual pallet can be moved to a desired location on the floor/store by uncoupling that a selected rolling pallet tray from the set.

In one example, low set air bags in a trailer floor raise the modular rolling platform so the rollers no longer contact the trailer floor. In other examples, the low set air bags provide some friction to prevent the rollers from turning. In other examples, the set of rollers include brakes or locks to prevent the roller(s) from turning.

Rows of locking devices in a trailer, in some examples, "high center" the rolling pallet trays. The device may lift the rolling pallet trays to prevent the rollers from touching the floor of trailer to lock the set of rolling pallet trays in place. Some examples may user trailer load lock rails to lock rolling pallet trays in place with a bar extension that latches into the rolling pallet trays. This requires minimal or no retro-fitting to trailers.

In an example scenario, the system includes rolling pallet trays upon which pallets are secured for transport. The rolling pallet trays move freight longitudinally between a transport position and a loading/unloading position.

The rolling pallet trays in other examples include electronic wheels and brakes that are activated wirelessly by an electromagnet in a trailer or other transport vehicle.

Alternatively, or in addition to the other examples described herein, examples include any combination of the following:

- wherein the plurality of configurable rolling pallet trays comprises the first rolling pallet tray, the second rolling pallet tray, and a third rolling pallet tray;
- a first connector device attached to a first side in the set of four sides of the rectangular base member, the first connector removably attached to a first receiver device on a first side in a set of four sides of the second rolling pallet tray;
- at least one connector device attached to at least one side of the rectangular base member of the third pallet tray, the at least one connector device removably attached to at least one receiver device of a side of at least one other rolling pallet tray in the plurality of rolling pallet trays, the plurality of configurable rolling pallet trays comprising the first rolling pallet tray, the second rolling pallet tray, and the third rolling platform tray is capable of interlocking together in thirty-six different rolling platform configurations;
- wherein the plurality of configurable rolling pallet trays comprises the first rolling pallet tray, the second rolling pallet tray, a third rolling pallet tray, and a fourth rolling pallet tray, each rolling pallet tray in the plurality of rolling pallet trays is removably connected to at least one other rolling pallet tray in the plurality of configurable rolling pallet trays;
- at least one connector device attached to at least one side in the set of four sides of the rectangular base member of the first pallet tray, the at least one connector device removably attached to at least one receiver device on a side of the second rolling pallet tray;
- at least one connector device attached to at least one side in a set of four sides of a rectangular base member of the third pallet tray, the at least one connector device removably attached to at least one receiver device on a side of at least one other rolling pallet tray in the plurality of configurable rolling pallet trays;
- at least one connector device attached to a side of the third pallet tray, the at least one connector device removably attached to at least one receiver device on a side of at least one other rolling pallet tray in the plurality of configurable rolling pallet trays, wherein the plurality of configurable rolling pallet trays comprising the first rolling pallet tray, the second rolling pallet tray, the third rolling platform tray, and the fourth rolling pallet tray is capable of interlocking together in at least one-hundred sixty different rolling platform configurations;
- a second connector device on a second side of the first rolling pallet tray removably connected to a second receiver device on a third rolling pallet tray;
- a third connector device on a third side of the first rolling pallet tray removably connecting the first rolling pallet tray to a third receiver device on a side of a fourth rolling pallet tray, wherein the first rolling pallet tray connected to the second rolling pallet tray, the third rolling pallet tray and the fourth rolling pallet tray forms a configurable rolling platform capable of moving four pallets simultaneously;
- a fourth connector device on a fourth side of the first rolling pallet tray removably connecting the first rolling pallet tray to a fourth receiver device on a side of a fifth rolling pallet tray, wherein the first rolling pallet tray connected to the second rolling pallet tray, the third rolling pallet tray, the fourth rolling pallet tray, and the fifth rolling pallet tray is a configurable rolling platform capable of moving five pallets simultaneously;
- a set of slots within the rectangular base member of the first rolling pallet tray configured to accommodate a set of rollers on the second pallet tray, wherein the first rolling pallet tray and the second rolling pallet tray are stackable when empty;
- a first wireless brake controller device of the first rolling pallet tray, wherein the first floor-lock brake is activated remotely when the first wireless brake controller device receives a brake-activation signal from a beacon device, and wherein a second floor-lock brake associated with the second rolling pallet tray is activated when a second wireless brake controller device associated with the second rolling pallet tray receives the brake-activation signal;
- a hinged leg associated with the bottom surface or a side in the set of four sides, wherein the hinged leg is folded down to stop movement of the first rolling pallet tray and wherein the hinged leg is folded up to resume rolling movement of the first rolling pallet tray;
- wherein dimensions of the first rolling pallet tray are equivalent to the dimensions of the second rolling pallet tray, wherein the top surface of the first rolling pallet tray and a top surface of the second rolling pallet tray are substantially level when the first rolling pallet tray is attached to the second rolling pallet tray;
- wherein the set of linking mechanisms comprises a spring-loaded pin and locking mechanism;
- wherein the set of linking mechanisms comprises a tongue-in-groove linking mechanism;
- a lip extending upward along a circumference of at least a portion of a top surface of at least one individual rolling pallet tray in the plurality of configurable rolling pallet trays;
- a first connector device attached to a first side of a first rolling pallet tray attached to a first receiver device on a side of a second rolling pallet tray, wherein the first rolling pallet tray pivots together with the second rolling pallet tray in a dependent manner while the first rolling pallet tray is connected to the second rolling pallet tray, and wherein the first rolling pallet tray removably connected to the second rolling pallet tray is a modular rolling platform capable of forming four different configurations of the modular rolling platform for transporting two different pallets simultaneously;
- a second connector device attached to a second side of the first rolling pallet tray attached to a second receiver device on a side of a third rolling pallet tray, wherein the first rolling pallet tray pivots together with the second rolling pallet tray or the third rolling pallet tray while the first rolling pallet tray is connected to the second rolling pallet tray and the third rolling pallet tray, and wherein the first rolling pallet tray removably connected to the second rolling pallet tray and the third rolling pallet tray is a modular rolling platform capable of forming thirty-six different configurations of the modular rolling platform for moving a plurality of different pallets simultaneously;

a third connector device attached to a third side of the first rolling pallet tray attached to a third receiver device on a side of a fourth rolling pallet tray, wherein the first rolling pallet tray connected to the second rolling pallet tray, the third rolling pallet tray, and the fourth rolling pallet tray is a configurable, modular rolling platform capable of accommodating four pallets simultaneously;

a set of slot members within a rectangular base member of each individual rolling pallet tray in the plurality of configurable rolling pallet trays, the set of slot members configured to accommodate a set of rollers on another individual rolling pallet tray, wherein each individual rolling pallet tray is stackable with other individual rolling pallet trays in the plurality of configurable rolling pallet trays;

a wireless brake controller device, wherein the braking mechanism is activated remotely when the wireless brake controller device receives the brake-activation signal from a remote computing device;

wherein each individual rolling pallet tray comprises a set of rollers attached to a bottom surface of each individual rolling pallet tray and a brake mechanism associated with the set of rollers to stop movement of at least one roller in the set of rollers in response to coming within range of an electromagnetic field.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

The examples illustrated and described herein as well as examples not specifically described herein but within the scope of aspects of the disclosure constitute exemplary means for a providing a configurable, modular rolling platform device for moving one or more pallets. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15 may constitute exemplary attaching means for connecting at least one side of a selected individual rolling pallet tray to at least one side of at least one other individual rolling pallet tray in the plurality of configurable rolling pallet trays, the attaching means capable of linking two or more individual rolling pallet trays together in a plurality of different configurations; exemplary braking means for stopping movement of at least one roller in the set of rollers associated with at least one individual rolling pallet tray in the plurality of configurable rolling pallet trays in response to receiving a brake-activation signal; exemplary signal receiving means for receiving the brake-activation signal to engage the braking means to stop movement of the modular rolling platform device; and exemplary detaching means for disconnecting a selected individual rolling pallet tray from the plurality of configurable rolling pallet trays in the modular rolling platform.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A modular rolling platform system for moving pallets comprising:

a plurality of configurable rolling pallet trays capable of interlocking together in a plurality of configurations, the plurality of configurable rolling pallet trays comprising a first rolling pallet tray and a second rolling pallet tray capable of interlocking together in at least four different rolling platform configurations;

the first rolling pallet tray in the plurality of configurable rolling pallet trays further comprising:

a rectangular base member, the rectangular base member comprising a top surface, a bottom surface, and a set of four sides, the top surface comprising an area sufficient to accommodate a single pallet;

a lip extending upward along a circumference of at least a portion of the top surface;

a set of rollers pivotally mounted to the bottom surface of the rectangular base member;

a floor-lock brake associated with the bottom surface of the rectangular base member configured to stop movement of at least one roller in the set of rollers upon activation of the floor-lock brake;

a set of linking mechanisms attached to at least one side in the set of four sides, the set of linking mechanisms comprising a connector device on a first side in the set of four sides, the connector device configured to removably attach to a receiver device on a side of the second rolling pallet tray, the first rolling pallet tray pivoting together with the second rolling pallet tray as a single unit when the first rolling pallet tray is removably connected to the side of the second rolling pallet tray via the set of linking mechanisms; and a first wireless brake controller device of the first rolling pallet tray, wherein the first floor-lock brake is activated remotely when the first wireless brake controller device receives a brake-activation signal from a beacon device, and wherein a second floor-lock brake associated with the second rolling pallet tray is activated when a second wireless brake controller device associated with the second rolling pallet tray receives the brake-activation signal.

2. The modular rolling platform system of claim 1, wherein the plurality of configurable rolling pallet trays comprises the first rolling pallet tray, the second rolling pallet tray, and a third rolling pallet tray, and wherein the set of linking mechanisms further comprises:
   a first connector device attached to a first side in the set of four sides of the rectangular base member, the first connector removably attached to a first receiver device on a first side in a set of four sides of the second rolling pallet tray; and
   at least one connector device attached to at least one side of the rectangular base member of the third pallet tray, the at least one connector device removably attached to at least one receiver device of a side of at least one other rolling pallet tray in the plurality of configurable rolling pallet trays, the plurality of configurable rolling pallet trays comprising the first rolling pallet tray, the second rolling pallet tray, and the third rolling platform tray is capable of interlocking together in thirty-six different rolling platform configurations.

3. The modular rolling platform system of claim 1, wherein the plurality of configurable rolling pallet trays comprises the first rolling pallet tray, the second rolling pallet tray, a third rolling pallet tray, and a fourth rolling pallet tray, each rolling pallet tray in the plurality of configurable rolling pallet trays is removably connected to at least one other rolling pallet tray in the plurality of configurable rolling pallet trays, and further comprising:
   at least one connector device attached to at least one side in the set of four sides of the rectangular base member of the first pallet tray, the at least one connector device removably attached to at least one receiver device on a side of the second rolling pallet tray;
   at least one connector device attached to at least one side in a set of four sides of a rectangular base member of the third pallet tray, the at least one connector device removably attached to at least one receiver device on a side of at least one other rolling pallet tray in the plurality of configurable rolling pallet trays; and
   at least one connector device attached to a side of the third pallet tray, the at least one connector device removably attached to at least one receiver device on a side of at least one other rolling pallet tray in the plurality of configurable rolling pallet trays, wherein the plurality of configurable rolling pallet trays comprising the first rolling pallet tray, the second rolling pallet tray, the third rolling platform tray, and the fourth rolling pallet tray is capable of interlocking together in at least one-hundred sixty different rolling platform configurations.

4. The modular rolling platform system of claim 1, further comprising:
   a second connector device on a second side of the first rolling pallet tray removably connected to a second receiver device on a third rolling pallet tray; and
   a third connector device on a third side of the first rolling pallet tray removably connecting the first rolling pallet tray to a third receiver device on a side of a fourth rolling pallet tray, wherein the first rolling pallet tray connected to the second rolling pallet tray, the third rolling pallet tray and the fourth rolling pallet tray forms a configurable rolling platform capable of moving four pallets simultaneously.

5. The modular rolling platform system of claim 4, comprising:
   a fourth connector device on a fourth side of the first rolling pallet tray removably connecting the first rolling pallet tray to a fourth receiver device on a side of a fifth rolling pallet tray, wherein the first rolling pallet tray connected to the second rolling pallet tray, the third rolling pallet tray, the fourth rolling pallet tray, and the fifth rolling pallet tray is a configurable rolling platform capable of moving five pallets simultaneously.

6. The modular rolling platform system of claim 1, further comprising:
   a set of slots within the rectangular base member of the first rolling pallet tray configured to accommodate a set of rollers on the second pallet tray, wherein the first rolling pallet tray and the second rolling pallet tray are stackable when empty.

7. The modular rolling platform system of claim 1, wherein the floor-lock brake of the first rolling pallet tray is deactivated remotely when the first wireless brake controller device receives a brake-release signal from a beacon device.

8. The modular rolling platform system of claim 1, wherein the floor-lock brake further comprises:
   a hinged leg associated with the bottom surface or a side in the set of four sides, wherein the hinged leg is folded down to stop movement of the first rolling pallet tray and wherein the hinged leg is folded up to resume rolling movement of the first rolling pallet tray.

9. The modular rolling platform system of claim 1, wherein dimensions of the first rolling pallet tray are equivalent to the dimensions of the second rolling pallet tray, wherein the top surface of the first rolling pallet tray and a top surface of the second rolling pallet tray are substantially level when the first rolling pallet tray is attached to the second rolling pallet tray.

10. The modular rolling platform system of claim 1, wherein the set of linking mechanisms comprises a spring-loaded pin and locking mechanism.

11. The modular rolling platform system of claim 1, wherein the set of linking mechanisms comprises a tongue-in-groove linking mechanism.

12. A modular rolling platform for moving pallets comprising:
   a plurality of configurable rolling pallet trays capable of interlocking together in a plurality of configurations, the plurality of configurable rolling pallet trays comprising a first rolling pallet tray and a second rolling pallet tray capable of interlocking together in at least four different rolling platform configurations, an individual rolling pallet tray in the plurality of configurable rolling pallet trays comprising a rectangular base member having a top surface area that is greater than or equal to a surface area of a base of an individual pallet, each rolling pallet tray in the plurality of configurable rolling pallet trays configured to interlock together in a plurality of different configurations;
   a plurality of linking mechanisms removably attaching the plurality of configurable rolling pallet trays together to form a modular rolling platform for moving a set of pallets along a substantially horizontal surface, an individual rolling pallet tray is added to the modular rolling platform by linking a connector device on the individual rolling pallet tray to a receiver device associated with the modular rolling platform, and an individual rolling pallet tray is removed from the modular rolling platform by detaching the connector device on the individual rolling pallet tray from at least one receiver device associated with the modular rolling platform;
a plurality of roller sets, an individual set of rollers pivotally mounted to a bottom surface of an individual rolling pallet tray of the modular rolling platform;
a plurality of braking mechanism, an individual braking mechanism associated with the individual set of rollers, the braking mechanism configured to stop movement of at least one roller in the individual set of rollers; and
a first wireless brake controller device of the first rolling pallet tray, wherein the first floor-lock brake is activated remotely when the first wireless brake controller device receives a brake-activation signal from a beacon device, and wherein a second floor-lock brake associated with the second rolling pallet tray is activated when a second wireless brake controller device associated with the second rolling pallet tray receives the brake-activation signal.

13. The modular rolling platform claim 12, further comprising:
a lip extending upward along a circumference of at least a portion of the top surface of at least one individual rolling pallet tray in the plurality of configurable rolling pallet trays.

14. The modular rolling platform of claim 12, further comprising:
a first connector device attached to a first side of a first rolling pallet tray attached to a first receiver device on a side of a second rolling pallet tray, wherein the first rolling pallet tray pivots together with the second rolling pallet tray in a dependent manner while the first rolling pallet tray is connected to the second rolling pallet tray, and wherein the first rolling pallet tray removably connected to the second rolling pallet tray is a modular rolling platform capable of forming four different configurations of the modular rolling platform for transporting two different pallets simultaneously.

15. The modular rolling platform of claim 14, further comprising:
a second connector device attached to a second side of the first rolling pallet tray attached to a second receiver device on a side of a third rolling pallet tray, wherein the first rolling pallet tray pivots together with the second rolling pallet tray or the third rolling pallet tray while the first rolling pallet tray is connected to the second rolling pallet tray and the third rolling pallet tray, and wherein the first rolling pallet tray removably connected to the second rolling pallet tray and the third rolling pallet tray is a modular rolling platform capable of forming thirty-six different configurations of the modular rolling platform for moving a plurality of different pallets simultaneously.

16. The modular rolling platform of claim 15, further comprising:
a third connector device attached to a third side of the first rolling pallet tray attached to a third receiver device on a side of a fourth rolling pallet tray, wherein the first rolling pallet tray connected to the second rolling pallet tray, the third rolling pallet tray, and the fourth rolling pallet tray is a configurable, modular rolling platform capable of accommodating four pallets simultaneously.

17. The modular rolling platform of claim 12, further comprising:
a set of slot members within a rectangular base member of each individual rolling pallet tray in the plurality of configurable rolling pallet trays, the set of slot members configured to accommodate a set of rollers on another individual rolling pallet tray, wherein each individual rolling pallet tray is stackable with other individual rolling pallet trays in the plurality of configurable rolling pallet trays.

18. The modular rolling platform of claim 12, wherein the top surface of the individual rolling pallet tray includes a non-slip surface.

19. The modular rolling platform of claim 12, wherein each individual rolling pallet tray comprises an individual set of rollers attached to a bottom surface of each individual rolling pallet tray and an individual brake mechanism associated with the individual set of rollers to stop movement of at least one roller in the set of rollers in response to coming within range of an electromagnetic field.

20. A modular rolling platform device comprising:
a plurality of configurable rolling pallet trays linked together in a modular rolling platform for moving a plurality of pallets simultaneously, an individual rolling pallet tray in the plurality of configurable rolling pallet trays pivots together with one or more other rolling pallet trays in the plurality of configurable rolling pallet trays, each rolling platform tray in the plurality of configurable rolling platform trays comprising a rectangular base member having a top surface area that is greater than or equal to a surface area of a base of an individual pallet, a bottom surface, and a set of rollers associated with the bottom surface;
attaching means for connecting at least one side of a selected individual rolling pallet tray to at least one side of at least one other individual rolling pallet tray in the plurality of configurable rolling pallet trays, the attaching means capable of linking two or more individual rolling pallet trays together in a plurality of different configurations;
braking means for stopping movement of at least one roller in the set of rollers associated with at least one individual rolling pallet tray in the plurality of configurable rolling pallet trays in response to receiving a brake-activation signal;
signal receiving means for receiving the brake-activation signal from a remote computing device, wherein receiving the brake-activation signal engages the braking means to stop movement of the modular rolling platform device, and wherein a first signal receiving means associated with a first rolling pallet tray in the plurality of configurable rolling pallet trays linked together in the modular rolling platform engages the braking means associated with the first rolling pallet tray and a second signal receiving means associated with a second rolling pallet tray in the plurality of configurable rolling pallet trays linked together in the modular rolling platform engages another braking means associated with the second rolling pallet tray; and
detaching means for disconnecting a selected individual rolling pallet tray from the plurality of configurable rolling pallet trays in the modular rolling platform.

* * * * *